United States Patent
Lim et al.

(10) Patent No.: US 11,563,835 B2
(45) Date of Patent: Jan. 24, 2023

(54) MOBILE TERMINAL

(71) Applicant: LG ELECTRONICS INC., Seoul (KR)

(72) Inventors: Donghwan Lim, Seoul (KR); Sangwook Park, Seoul (KR); Junhong Kang, Seoul (KR); Ara Kim, Seoul (KR); Sungdo Kim, Seoul (KR); Minchul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 17/214,552

(22) Filed: Mar. 26, 2021

(65) Prior Publication Data

US 2022/0166861 A1 May 26, 2022

(30) Foreign Application Priority Data

Nov. 26, 2020 (WO) ................ PCT/KR2020/016950

(51) Int. Cl.
*H04M 1/00* (2006.01)
*H04M 1/02* (2006.01)
*G06F 1/16* (2006.01)

(52) U.S. Cl.
CPC ........ *H04M 1/0237* (2013.01); *G06F 1/1624* (2013.01); *G06F 1/1652* (2013.01); *G06F 1/1681* (2013.01); *H04M 1/0268* (2013.01)

(58) Field of Classification Search
CPC ............. H04M 1/0237; H04M 1/0268; H04M 1/0235; H04M 1/0241; H04M 2201/38; G06F 1/1624; G06F 1/1652; G06F 1/1681

See application file for complete search history.

(56) References Cited

U.S. PATENT DOCUMENTS

2010/0259463 A1 * 10/2010 Sip ...................... H04M 1/0247
 345/1.3
2019/0196541 A1 6/2019 O'Neil et al.
2021/0181800 A1 * 6/2021 Ko ........................ G06F 1/1656

FOREIGN PATENT DOCUMENTS

KR 1020110082943 * 7/2011
KR 1020130134648 12/2013
KR 1020190004618 1/2019

OTHER PUBLICATIONS

PCT International Application No. PCT/KR2020/016950, International Search Report dated Aug. 23, 2021, 9 pages.

* cited by examiner

*Primary Examiner* — Nhan T Le
(74) *Attorney, Agent, or Firm* — Lee, Hong, Degerman, Kang & Waimey PC

(57) ABSTRACT

Disclosed is a mobile terminal, including a body including a first frame and a second frame slidably movably coupled to the first frame in first or second direction, a flexible display unit including a side face portion surrounding one side of the body, and a driver. A rear face of the first frame includes a first rear face exposed to the rear face of the first frame in the second state and a second rear surface that remains overlapping with the second frame in the second state. The driver includes a motor installed in the second frame, a pinion gear configured to rotate upon receiving a rotational force of the motor, and a rack gear fastened to the second rear surface of the first frame and configured to be extended along the first direction and to move linearly in engagement with the pinion gear.

18 Claims, 27 Drawing Sheets

(a)

(b)

(a)     (b)

(a)

(b)

(a)   (b)

(a)                    (b)

(a)

(b)

(c)

(a)

(b)

(a)

(b)

(c)

(a)

(b)

(c)

(d)

(a)

(b)

(a)

(b)

(a)

(b)

(a)

(b)

(a)

(b)

(a)

(b)

(a)

(b)

(a)

(b)

(a)

(b)

(a)                (b)

(a)    (b)

MOBILE TERMINAL

CROSS-REFERENCE TO RELATED APPLICATION(S)

Pursuant to 35 U.S.C. § 119(a), this application claims the benefit of an earlier filing date and right of priority to International Application No. PCT/KR2020/016950 filed on Nov. 26, 2020, the contents of which are hereby incorporated by reference herein in its entirety.

BACKGROUND

Field

The present disclosure relates to a mobile terminal, and more particularly, to a mobile terminal that has a flexible display and is capable of extending a size of a screen while the display is scrolled and slid at the same time.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display having sufficient elasticity and capable of large deformation has been developed. The size of a mobile terminal can be varied using the deformable nature of the flexible display. For the mobile terminal having such a variable structure, changing the size of the mobile terminal should be stably performed, and there is a need for a structure to support the extended display unit to maintain a flat state of the display unit.

In addition, the number of components exposed to an external environment needs to be minimized in order to prevent contaminants from being introduced into the mobile terminal due to a variable size structure of the mobile terminal.

SUMMARY OF THE DISCLOSURE

One purpose of the present disclosure is to provide a mobile terminal that may improve durability of a flexible display unit by not restricting a point where the flexible display unit is bent to a specific position.

To achieve these objects and other advantages and in accordance with the purpose of the disclosure, as embodied and broadly described herein, a mobile terminal switchable to a first state and to a second state extended in a first direction in the first state include a body including a first frame and including a second frame slidably movably coupled to a rear face of the first frame in the first direction or in a second direction opposite to the first direction, a flexible display unit including a front face portion positioned on a front face of the body, a rear face portion positioned on a rear face of the body, and a side face portion connecting the front face portion and the rear face portion of the display unit and surrounding one side of the body; and a driving unit configured to slidably move the first frame in the first direction or the second direction with respect to the second frame. A rear face of the first frame includes a first rear face exposed to the rear face of the first frame in the second state and a second rear face maintaining a state of overlapping with the second frame in the second state. The driving unit include a motor installed in the second frame, a pinion gear configured to rotate by receiving rotational force of the motor, and a rack gear fastened to the second rear face of the first frame and configured to be extended in the first direction and to perform linear motion in engagement with the pinion gear.

A plurality of motors and a plurality of pinion gears may be separately arranged in the first direction, and the rack gear may perform linear motion in engagement with at least one of the plural pinion gears.

A pair of pinion gears may be arranged in parallel in the first direction, and the mobile terminal may further include a gear chain configured to simultaneously surround the pair of pinion gears and to synchronize rotation of the pair of pinion gears.

The mobile terminal may further include a slide frame slidably coupled to a rear face of the second frame in the first direction or the second direction, an end of the flexible display unit being fixed to a rear face of the slide frame, and an auxiliary rack gear fastened to a front face of the slide frame and configured to rotate in engagement with the pinion gear.

A pair of pinion gears may be arranged in parallel in the first direction, and the rack gear and the auxiliary rack gear may slidably move in engagement with at least one of the pair of pinion gears.

The pinion gear may rotate in engagement with one of the rack gear and the auxiliary rack gear and may slidably move the first frame and the slide frame.

A length of the auxiliary rack gear may be shorter than a length of the rack gear.

The rack gear may include a fixed gear fastened to the second rear face of the first frame, and a flexible gear connected to an end of the fixed gear and configured to be bending-deformable in the first state and the second state, and the flexible gear may not be fastened to the first frame.

The mobile terminal may further include a curved guide positioned inside the second frame and configured to guide bending deformation of the flexible gear.

The pinion gear may rotate about a rotational axis extended to a third direction perpendicular to the first direction, and the flexible gear may be bent in a thickness direction of the mobile terminal.

The pinion guide may rotate about a rotational axis extended in a thickness direction of the mobile terminal, and the flexible gear may be bent in a third direction of the mobile terminal (? a third direction perpendicular to the first direction).

A pair of driving units may be separately arranged in a third direction perpendicular to the first direction.

As described above, the mobile terminal according to the present disclosure has a variable size and thus usability and portability may be improved.

In addition, since the curved portion of the flexible display unit is not limited to a specific region, stress applied only to a specific region when the size of the mobile terminal is changed may be distributed.

In addition, even when the mobile terminal is extended, the display unit may be stably maintained flat, so that a continuous large screen may be implemented in the extended state.

In addition, since the sliding movement of the mobile terminal may be performed naturally without distortion, the mobile terminal may be prevented from damage and failure during use.

In addition, since the rack gear 205 is prevented from being exposed to the outside in an extended state, introduction of contaminants may be prevented and durability may be improved.

Additional scope of applicability of the present disclosure will be apparent from detailed description below. However, various changes and modifications within the spirit and scope of the present disclosure may be clearly understood by those skilled in the art, thereby specific embodiments, such as the following detailed description and exemplary embodiment of the present disclosure are to be understood as only given examples.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
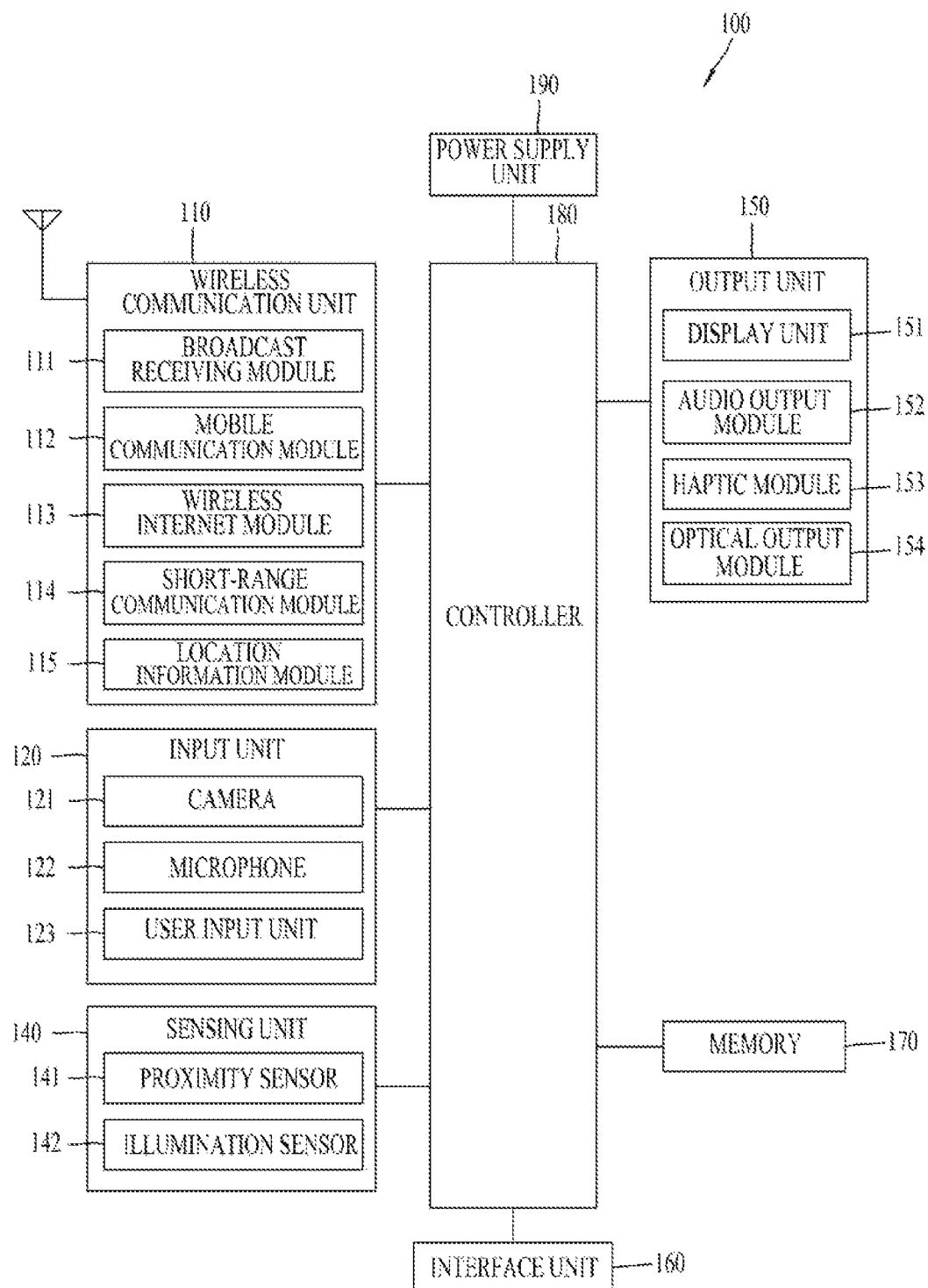
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a fingerprint scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
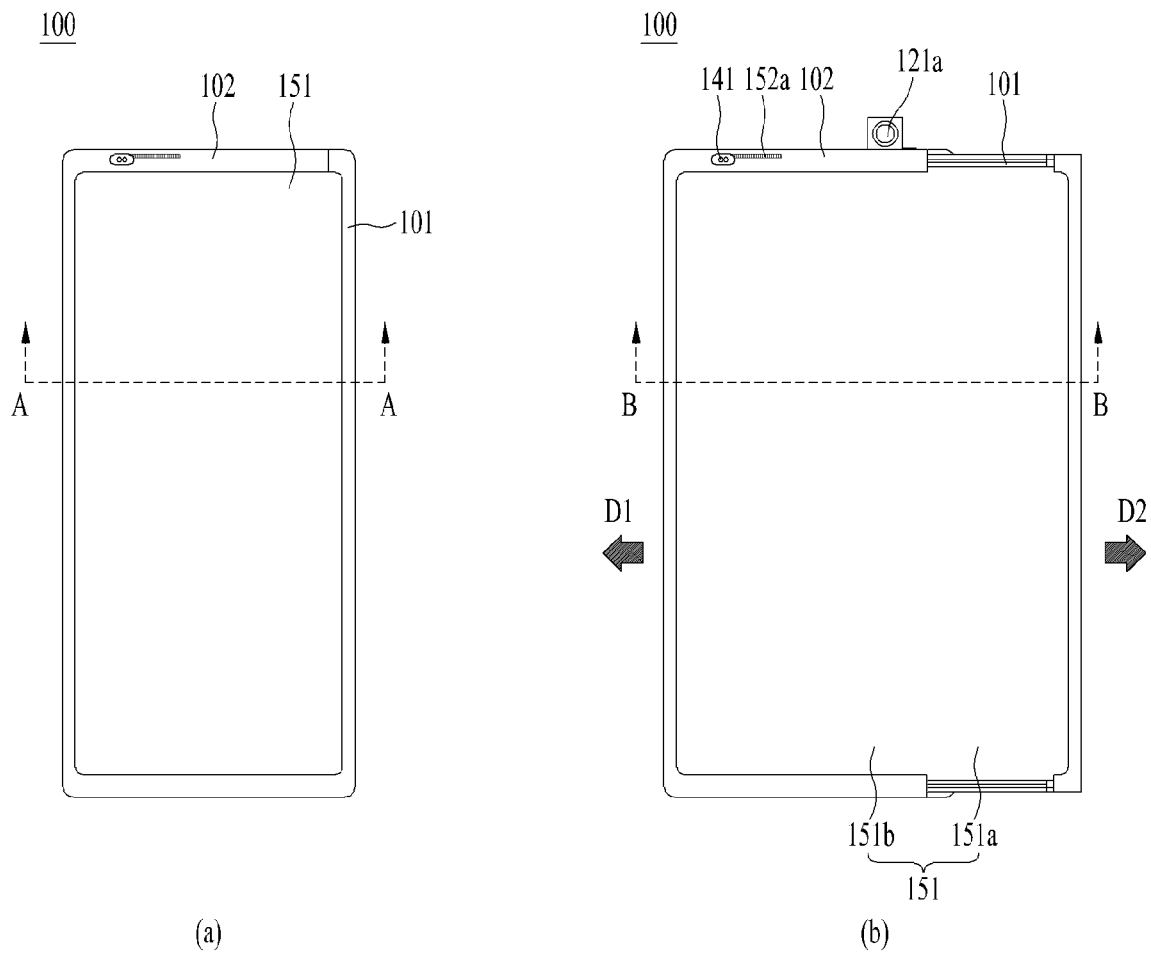
FIG. 2 is a front view of a first state and a second state of the mobile terminal in accordance with an embodiment.
Figure 3:
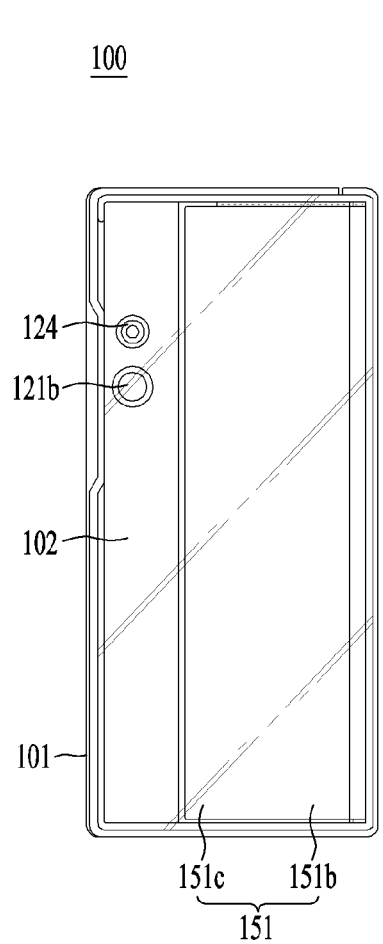
FIG. 3 is a rear view of the first state and the second state of the mobile terminal in accordance with an embodiment.
Figure 3:
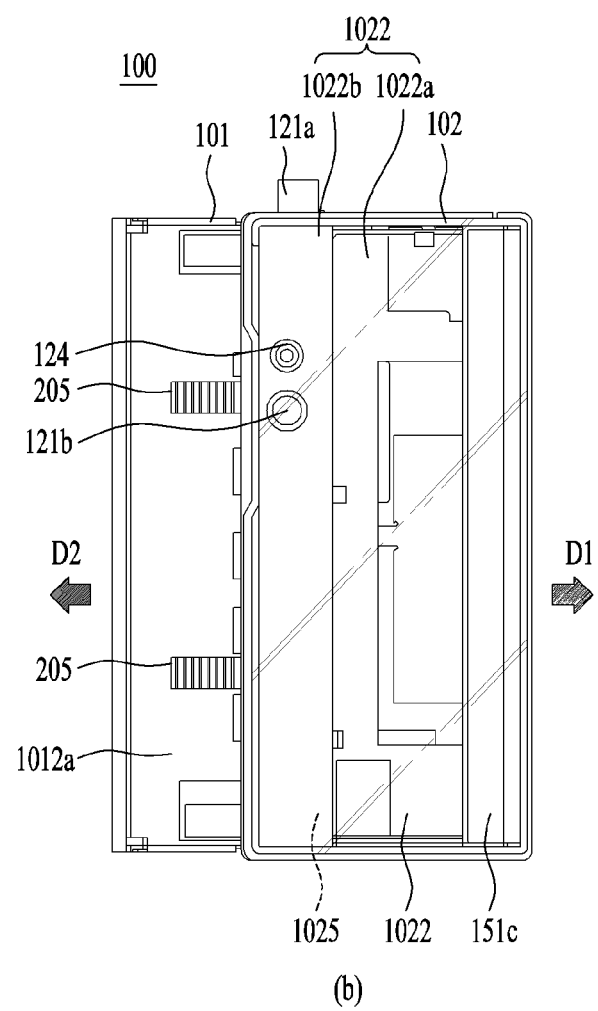

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

The mobile terminal 100 of the present disclosure includes a body having a variable size. The body includes a first frame 101 and a second frame 102. The second frame 102 moves in a first direction or a second direction of the first frame 101 and the size of the body is variable. A first state refers to a state in which the body (or mobile terminal) is contracted and the second state refers to a state in which the body (mobile terminal) is extended.

Movements of the first frame 101 and the second frame 102 are relative. When the first state switches to the second state, the second frame 102 moves in the first direction based on the first frame 101, and the first frame 101 moves in the second direction based on the second frame 102. Therefore, expansion in the first direction refers to expansion in a horizontal direction in the figures. As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face portion, and the other part of the flexible display unit 151 positioned on the rear is called a rear face portion. As illustrated in FIG. 2, the mobile terminal may extend in the first direction or contract in the second direction opposite to the first direction. In this case, the area of the flexible display unit 151 positioned on the front changes. That is, the sizes of the front face portion and the rear face portion may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face portion of the display unit 151 moves, so that the size of the front face portion of the display unit 151 may be adjusted. Since the size of the flexible display unit 151 is determined and the flexible display unit 151 is formed of one continuous body, an area of the rear face portion of the display unit 151 decreases as an area of the front face portion of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

As shown in FIG. 3, the mobile terminal 100 may include a rear camera 121b positioned at a rear face thereof. In the first state, the rear face portion of the display unit 151 is located in the first direction, and components such as the camera 121b, the user input unit 123, an antenna, and a fingerprint scan sensor may be mounted in a space in the second direction.

Figure 4:
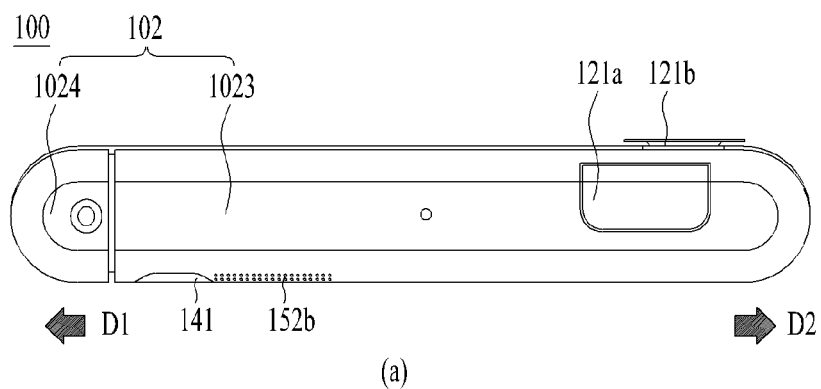
FIG. 4 is a side view of the mobile terminal viewed from a third direction.
Figure 4:
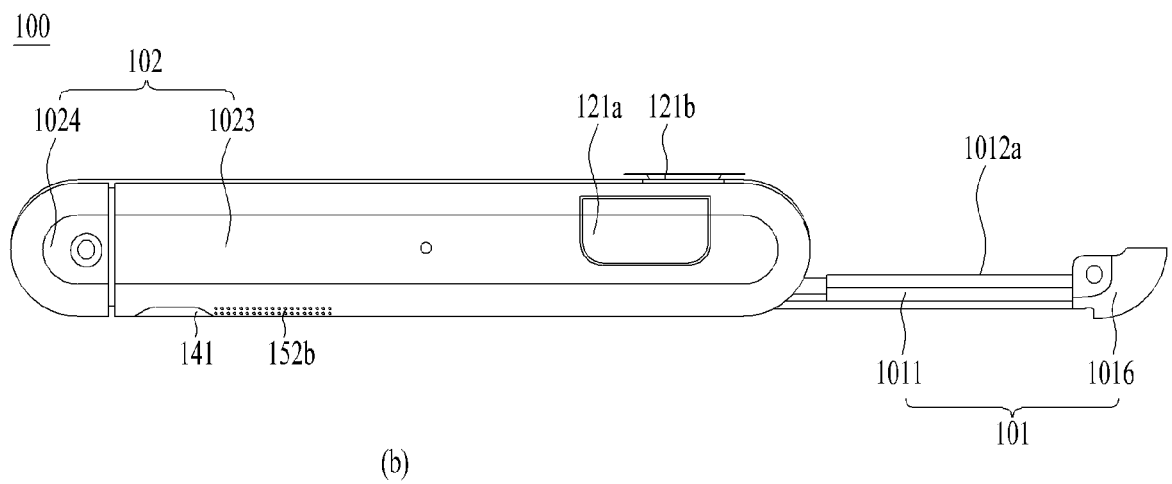

FIG. 4 is a side view of the mobile terminal 100 viewed from a third direction. The first frame 101 of the present disclosure is made of a plate-shaped member which is thin relative to the second frame 102 and supports a rear surface of a first region of the display unit 151. The first area slidably moves to expand the area of the front face portion of the flexible display unit 151. The second frame 102 is thicker than the first frame 101 and includes a front portion and a rear portion 1022. Various components may be accommodated between the front portion and the rear portion 1022. The flexible display unit 151 may be rolled at an end of the second frame facing in the first direction and may be extended in a rear direction of the second frame 102. The second frame 102 may include a curved surface at the end portion thereof facing in the first direction and may further include a side frame 1024 for protecting a side face portion of the flexible display unit 151 that is bent while surrounding the second frame 102.

The thickness of the first frame 101 is thin and components are substantially mounted in the second frame 102. The rear surface of the mobile terminal in the first state may be formed by the rear portion 1022 of the second frame 102. The rear portion 1022 of the second frame 102 may include a first rear portion 1022a in which a rear face of the flexible display unit 151 is located in the first direction and a second rear portion 1022b that is always exposed rearward in the first state and in the second state.

The rear camera 121b may be installed on the second rear portion 1022b towards the rear face of the mobile terminal. The rear camera 121b may include a plurality of cameras having different angles of view, such as a wide angle, an ultra-wide angle, and a telescope. In addition to the rear camera 121b, a proximity sensor 141, an audio output unit 152, etc. may be located on the second rear portion 1022b, and an antenna may also be installed on the second rear portion 1022b.

In the first state, the rear camera 121b is arranged in parallel with the rear face portion of the display unit 151 as shown in FIG. 3(a), so that selfie capturing may be taken with the rear camera 121b. In order to capture an object viewed by a user, the user may take a picture while looking at the front face portion of the display unit 151 even in the second state as well as in the first state. In the second state, the rear camera 121b is located at the center of the mobile terminal 100 as shown in (b) of FIG. 3, so it is easy to adjust the position of a subject to the center while viewing the display unit during capturing.

The first rear portion 1022a of the second frame 102 is a space to which the rear portion of the display unit 151 moves. A rear cover 1025 may be further included to prevent the first rear portion 1022a of the second frame 102 from being exposed to an external environment without interfering with the movement of the display unit 151. The display unit 151 and a slide frame may move between the rear cover 1025 and the first rear portion 1022a. The rear cover 1025 may cover only the first rear portion 1022a or both the first rear portion 1022a and the second rear portion 1022b to protect components such as a camera.

The rear cover 1025 may be configured such that the interior thereof is visible to the user only when the display unit 151 is activated through mirror coating and the interior thereof is not visible when the display unit 151 is turned off. Transparency may be raised by omitting mirror coating of the rear cover 1025 only with respect to a portion in which the rear camera 121b is located.

As shown in FIG. 2(b) and FIG. 3(b), the mobile terminal 100 may further include a pop-up camera 121a protruding from an end of the mobile terminal 100 facing in the third direction. Since the camera requires a lens of a predetermined size or more to secure image quality such as resolution, it is difficult to reduce the size of a bezel of an upper portion of the mobile terminal when the camera is positioned on a bezel of the upper portion of the display unit 151. In order to minimize the size of the bezel of the upper portion of the front face of the mobile terminal, the camera may be implemented as a pop-up camera that is selectively inserted and withdrawn.

When the pop-up camera 121a is not in use, the pop-up camera 121a may be located inside the second frame 102 and may protrude upward when the user activates the camera function. Although the pop-up camera 121a protrudes in the second state in the figure, the pop-up camera 121a may be withdrawn from the second frame 102 when the camera function is activated even in the first state.

The pop-up camera 121a may be pulled out from the second frame 102 using an elastic member or may be pulled out using a separate motor 201. When the motor 201 is used, the pop-up camera 121a may be automatically withdrawn or inserted according to whether the user activates the camera function. Although the pop-up camera 121a is disposed to face the front of the mobile terminal in the figure, the pop-up camera 121 may be disposed to face the rear of the mobile terminal by rotating the pop-up camera 121.

Alternatively, the pop-up camera 121a may include a rotatable camera that may capture an image through a lens hole formed in the second rear portion to face backward when the cameral is inserted into the second frame 102 and capture a selfie to face forward when the camera is withdrawn.

In another embodiment, while the pop-up camera 121a is hinged, the rear camera 121b located in the rear direction may rotate by 180 degrees to change direction thereof forward, thereby capturing the front of the mobile terminal.

When the pop-up camera 121a is inserted into the frame, the pop-up camera 121a may rotate to face backward, thereby functioning as the rear camera 121b. Both the pop-up camera 121a and the rear camera 121b of the mobile terminal may be implemented as camera modules.

Figure 5:
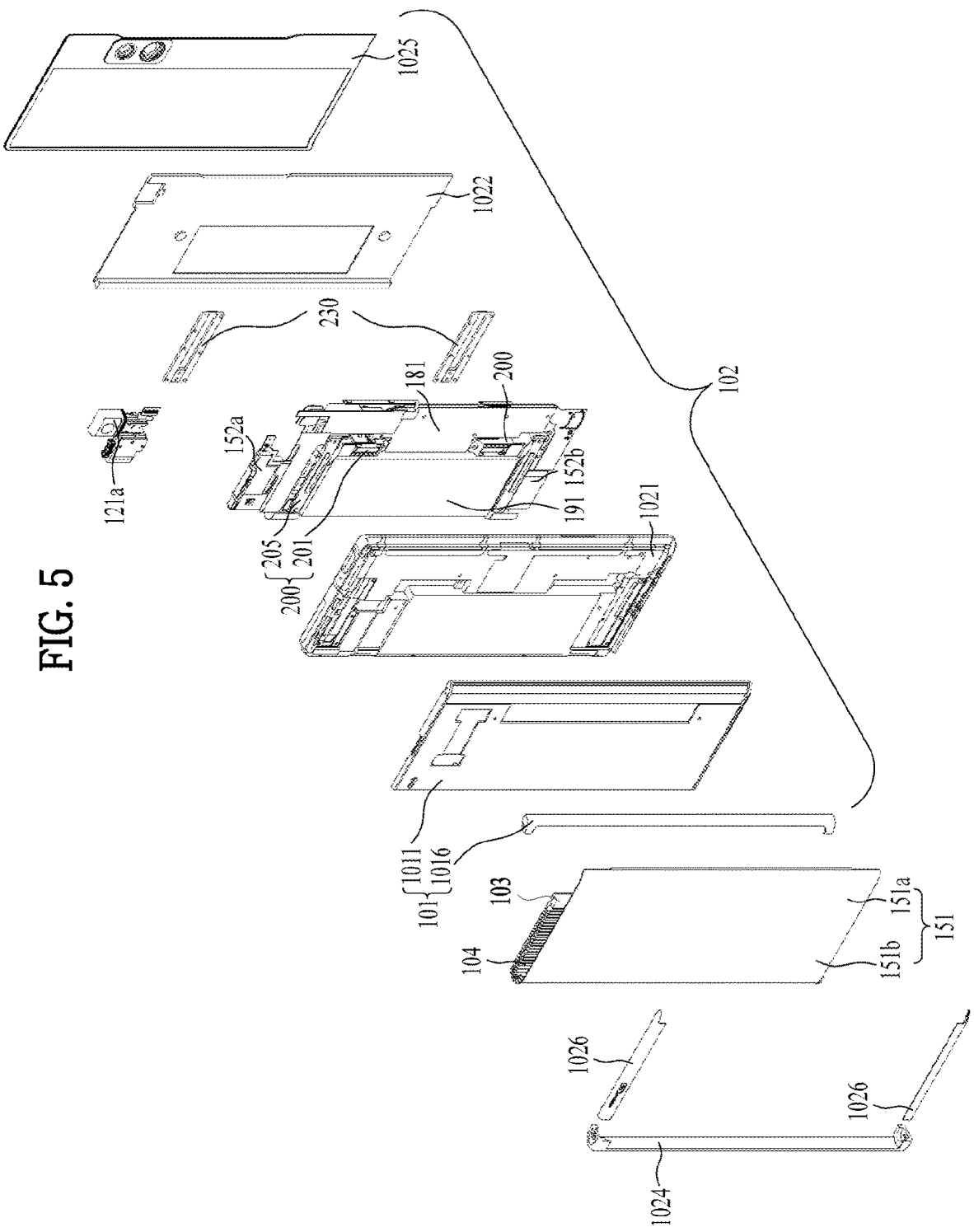
FIGS. 5 and 6 are exploded perspective views of the mobile terminal in accordance with an embodiment.
Figure 6:
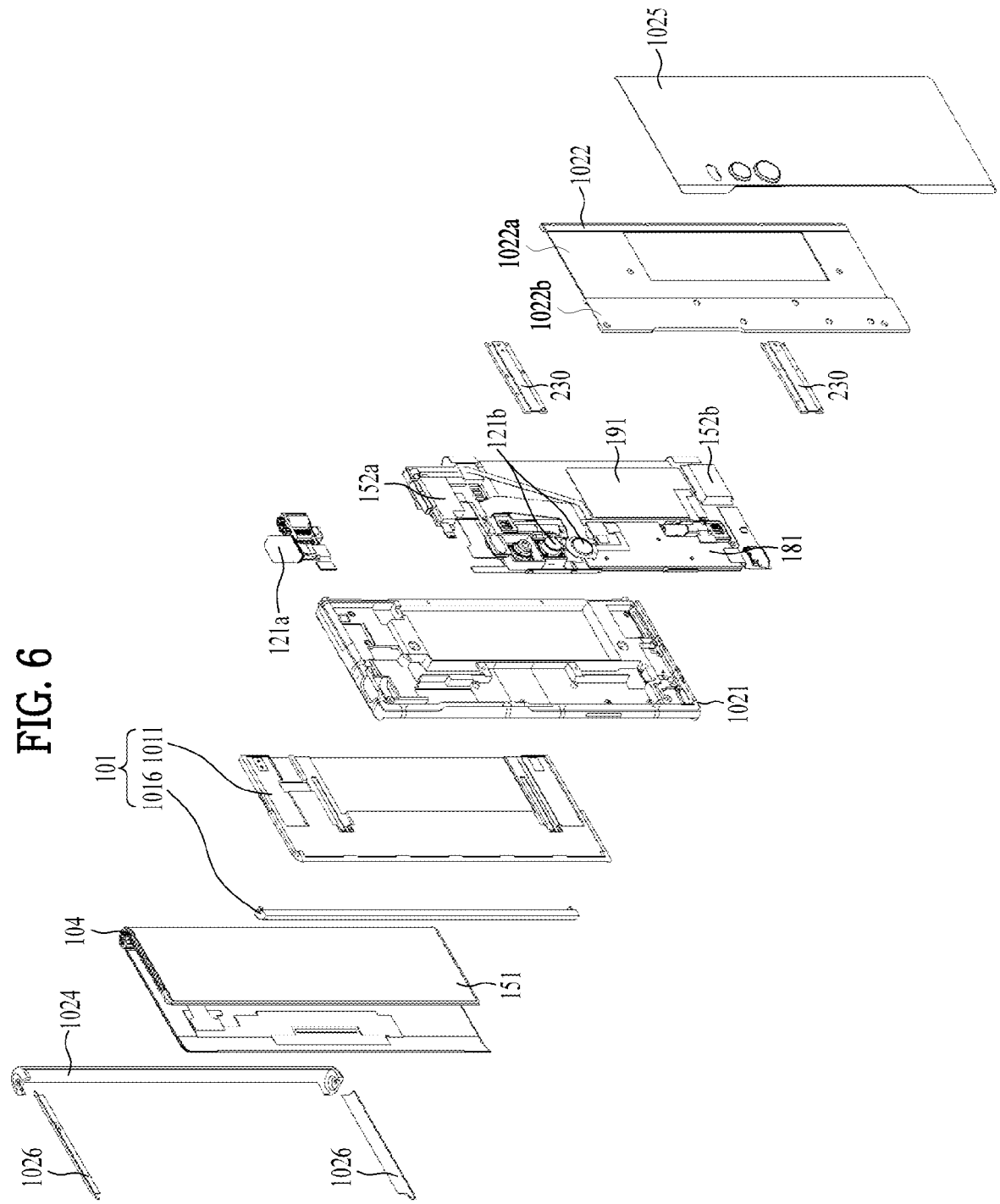

FIGS. 5 and 6 are exploded perspective views of the mobile terminal in accordance with an embodiment. FIG. 5 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction.

Electronic components are mounted in the frames 101 and 102, and the flexible display unit 151 is located outside the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101.

The first frame 101 constitutes the front face of the mobile terminal and is coupled to the second frame 102 on the rear face of the first frame 101. The second frame 102 may be configured as a main body including a space in which various components are accommodated between the front portion 1021, the rear portion 1022, and a side portion forming the side appearance of the mobile terminal 100. The camera 121, the audio output unit 152, an input/output terminal, the controller 180, and the power supply unit 190 may be accommodated as components of the mobile terminal 100 in a space within the second frame 101. For example, the controller 180 may be a circuit board 181 including a processor and an electronic circuit that control the operation of the mobile terminal 100, and the power supply unit 190 may be a battery 191 and related components. The driving unit 200 for controlling the sliding movement of the first frame 101 may also be accommodated in the second frame 102. A sound hole of the sound output unit 152a mounted in the second frame 102 may be formed at an end of the second frame 102 facing in the third direction, i.e., at a position that does not overlap with the first frame 101, as shown in FIG. 2.

The first frame 101 may be slidably coupled to the front of the second frame 102 in the second direction. The first region 151a of the display unit 151 may be only coupled to the first frame 101 and all other electronic components may be located in the second frame 102. As described above, in order to form the sound hole of the sound output unit 152a in the second frame 102, front decorations 1026 in the third direction and in a fourth direction which is the opposite direction to the third direction may be configured to be coupled to the second frame 102. An edge decoration 1016 serves to fix an end of the first region 151a to the first frame 101. When the mobile terminal 100 is expanded to the second state, since an end portion facing in the second direction is weak, a metal material may be used to reinforce rigidity thereof.

In addition, a front end of the flexible display unit 151 may have a curved portion to form a symmetrical configuration with the side face portion rolled in the second direction and may be coupled to the first frame 101. The front end of the flexible display unit 151 may include a curved surface corresponding to a curved surface of the flexible display unit 151.

As described above, the display unit 151 has the continuous body, and thus, may be disposed on both the front face and the rear face of the mobile terminal 100 while being rolled in the mobile terminal 100. The display unit 151 may include the front face position positioned at the front face of the mobile terminal 100, the rear face portion positioned at the rear face of the mobile terminal 100, and the side face portion positioned between the front face and the rear face thereof and surrounding the side face of the mobile terminal. The front face portion and the rear face portion of the display unit 151 are flat, and the side face portion of the display unit 151 may form a curved face. The flexible display unit 151 may be damaged when being bent at an angle. Thus, the flexible display unit 151 may be formed to be bent with a predetermined curvature at the side face portion.

The display unit 151 may be divided into a fixed portion 151a and a variable portion 151b. The fixed portion 151a means a portion fixed to the frame. Because of being fixed to the frame, the fixed portion 151a maintains a constant shape without changing a bending degree. On the other hand, the variable portion 151b means a portion in which a bending angle or a position of the bent portion changes. The variable portion 151b in which the position or bending angle of the bent portion changes requires a structure for supporting a rear face of the variable portion 151b in response to the change.

The fixed portion 151a is coupled to the first frame of the display unit and is always positioned on the front face portion of the display unit to form a portion of the front face portion of the display unit. The variable portion 151b includes a side face located at a side portion of the mobile terminal, and a position of the side face varies depending on the position of the second frame. Based on a side face, an area of a portion disposed on the front face portion of the display unit and an area of a portion disposed on the rear face portion of the display unit vary. That is, a portion of the variable portion 151b may be the front face and another portion of the variable portion 151b may be the rear face based on the first and second states. The variable portion 151b is positioned in the first direction with respect to the fixed portion 151a relative to the mobile terminal, and an end of the variable portion 151b is bent toward the rear face of the mobile terminal and slides on the rear face of the second frame 102.

The end of the variable portion of the display unit is coupled with a slide frame 103 that guides the variable portion to slide move on the rear face of the second frame 102, and the slide frame 103 moves in the first direction at the same time as the second frame 102 moves in the first direction. As a result, a moving distance of the slide frame 103 with respect to the first frame 101 is twice as a moving distance of the second frame 102 with respect to the first frame 101. In addition, the display unit 151 may be bent 180 degrees while being rolled in the second frame 102 to be disposed on both the front face and the rear face of the mobile terminal 100. For such an arrangement of the display unit 151, the second frame 102 may include a roller rotatably disposed therein.

However, the display unit 151 should be spread flat on the front face and the rear face of the mobile terminal 100 to provide a good quality screen to the user. Further, for such spread, a proper tension must be provided on the display unit 151. In order to provide the proper tension, the roller may be disposed at a first directional end of the second frame 102. The roller may be rotatably coupled to the second frame 102. A plurality of rollers 200 with a short length may be distributively disposed in the third direction in consideration of arrangement of components mounted in the second frame 102.

The display unit 151 may be rolled around the roller while being gently bent with a predetermined curvature. The flexible display unit 151 may include a first face on which a video is output and exposed to the outside and an inner face facing the frame at the opposite side. The roller may be installed to rotate freely in the second frame 102 while being in contact with the inner face of the display unit 151. The roller may be disposed adjacent to the end of the second frame 102 that faces in the first direction. A side frame 1024 may be disposed at the end of the second frame 102 facing in the first direction to prevent damage to the display unit 151 rolled around the roller.

The side frame 1024 is elongated in a longitudinal direction (third direction) of the second frame 102 to cover a side portion of the side frame 1024 facing in the first direction. Accordingly, the side frame 1024 may protect the display unit 151 wound on an end of the second frame 102 facing in the first direction. An inner side face of the side frame 1024 may include a curved surface corresponding to the curvature of the side portion of the side frame 1024.

The side frame 1024 may substantially form the outer appearance of the mobile terminal 100 together with a side portion 1023 of the first frame 101. In addition, in order to minimize interference with components in the first frame 101 during movement of the first frame 101, a side portion of the second frame 102 facing in the second direction may be omitted.

In addition, the body may expand and contract the size of the mobile terminal 100 itself, especially the front surface of the mobile terminal 100, by expansion and contraction in the first direction D1 and the second direction D2. The display unit 151 should be moved by this expanded or reduced front surface in order to obtain the intended first and second states. However, when fixed to the second frame 102, the display unit 151 may not be smoothly moved to fit the front face of the mobile terminal 100 that is expanded or contracted. For this reason, the display unit 151 may be movably coupled to the second frame 102.

More specifically, the display unit 151 may include the first region 151a disposed on the front face of the mobile terminal 100 and the second region 151b which is extended in the first direction from the first region 151a and is bent while surrounding the second frame 102. The second region 151b may move forward or backward according to switching of the state of the mobile terminal 100 and switch from the front face portion to the rear face portion or from the rear face portion to the front face portion.

The slide frame 103 may be made of a plate-shaped member elongated in a longitudinal direction (third direction) of the mobile terminal 100 and may be movably coupled to the second rear portion 1022 in the first and second directions D1 and D2. An end of the second region 115b is coupled to a rear face of the slide frame 103 so that the sliding movement of the slide frame 103 may be interlocked with the sliding movement of the first frame 101 and the movement of the display unit 151.

The regions 151a and 151b of the display unit 151 may be connected to each other and may form a continuous body of the display unit 151. As described above, for the movement of the second region 151b to the front face or rear face of the mobile terminal 100 according to a movement direction of the second frame 102, the first region 151a may be fixed to the front face of the mobile terminal 100 so as not to be movable and may be provided to be movable on the rear face of the mobile terminal 100. The configuration of the display unit 151 will be described in more detail below.

The first region 151a may be disposed on the front face of the mobile terminal 100, more specifically, on the front face of the first frame 101. The first region 151a may always be exposed on the front face of the mobile terminal 100.

The second region 151b is a portion adjacently extended to the first region 151a in the first direction and surrounds an end of the second frame 102 facing in the first direction. A portion of the second region 151b is located on the rear face of the mobile terminal 100 to constitute the rear face of the mobile terminal 100.

The rear portion of the second area 151b may be disposed on the rear face of the mobile terminal 100, more specifically, the rear face of the rear portion 1022 of the second frame 102. The second area 151b may slide from the rear face of the second frame 102 by being coupled to the slide frame 103 without being directly coupled to the second frame 102.

The first region 151a is disposed on the front face of the mobile terminal 100 and is always exposed on the front face regardless of the movement of the second frame 102. The area of the second region 151b located on the front face and rear face of the second frame 102 is changed according to the movement directions D1 and D2 of the second frame 102.

A specific location of the foldable mobile terminal in a form of being spread like a book is easily damaged because only the specific location is folded repeatedly. On the other hand, the side face portion of the flexible display unit 151 may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

Figure 7:
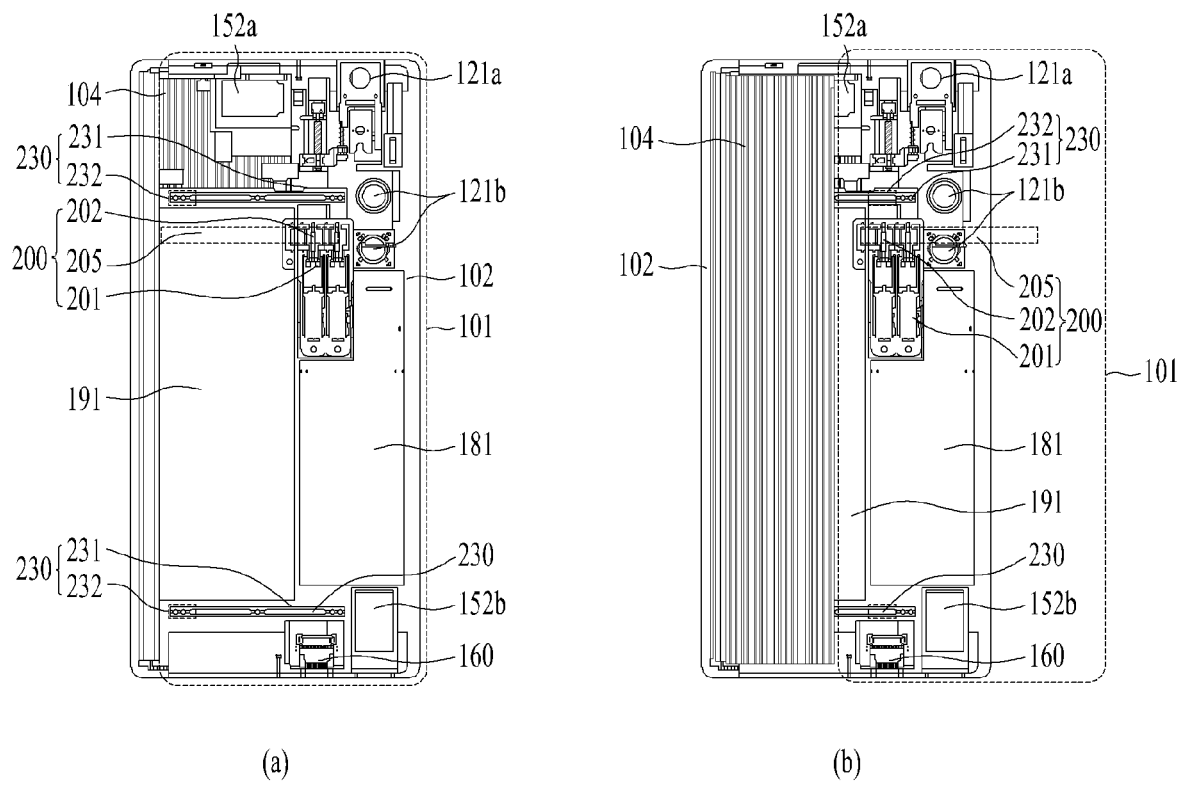
FIG. 7 is a view illustrating the interior of the mobile terminal in accordance with an embodiment.

FIG. 7 is a view illustrating the interior of the mobile terminal 100 in accordance with an embodiment, in which FIG. 7(a) shows the first state and FIG. 7(b) shows the second state. The mobile terminal 100 of the present disclosure may switch the state thereof in such a manner that the user pushes and pulls the first frame 101 in the first direction D1 or the second direction D2 with respect to the second frame 102. However, a manual switching method may cause a risk of damage when excessive force is applied to the main body of the mobile terminal 100. Therefore, the mobile terminal 100 may further include the driving unit 200 using the motor 201 so that the second frame 102 may stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear 202 to receive the rotational force of the motor 201 may be arranged to engage with a rack gear 205 composed of teeth continuously arranged in the first direction. The pinion gear 202 may be fixed to the first frame 101 together with the motor 201 and the rack gear 205 may be positioned on the second frame 102. Alternatively, the rack gear 205 may be positioned on the first frame 101, and the motor 201 and the pinion gear 202 may be arranged on the second frame 102. Since the motor 201 holds the pinion gear 202 such that the pinion gear 202 does not rotate, the second frame 102 may maintain the first state and the second state. However, when large external force is applied, the second frame 102 may be displaced as the pinion gear 202 rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

To arrange a battery or the like, the driving unit 200 may be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or as shown in FIG. 7, vice versa.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
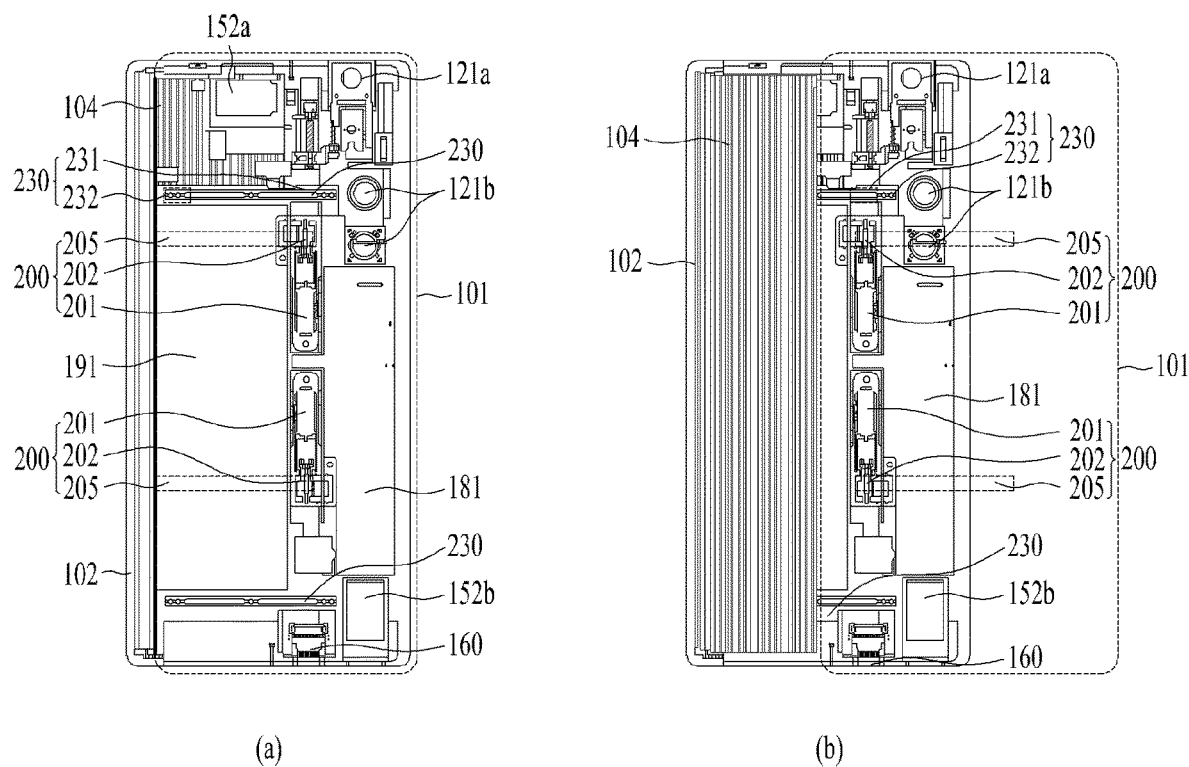
FIG. 8 is a view illustrating the interior of the mobile terminal in accordance with another embodiment.

FIG. 8 is a view illustrating the interior of the mobile terminal 100 in accordance with another embodiment. Unlike the above-described embodiment, a pair of motors 201 is separately disposed in a vertical direction.

As described above, the arrangement of the eccentric motor 201 has a problem in that the first frame 101 is inclined to one side and is distorted when the first frame 101 is moved. If an upper side and a lower side of the mobile terminal 100 do not move at the same speed, malfunction of the motor 201 may occur, and tensile force and contraction may occur on one side and the other side of the flexible display unit 151, respectively, thereby resulting in damage.

When a pair of motors 201 is separately arranged in the vertical direction, distortion in the vertical direction may be prevented while providing sufficient driving force. In addition, since the driving unit 200 disposed in the vertical direction balances in the vertical direction, the separate linear guide 230 may be omitted.

Figure 9:
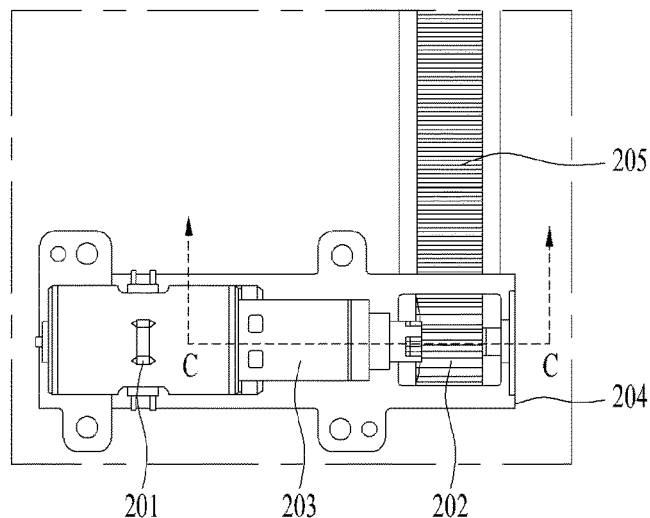
FIG. 9 is a view illustrating a driving unit of the mobile terminal in accordance with an embodiment.
Figure 9:
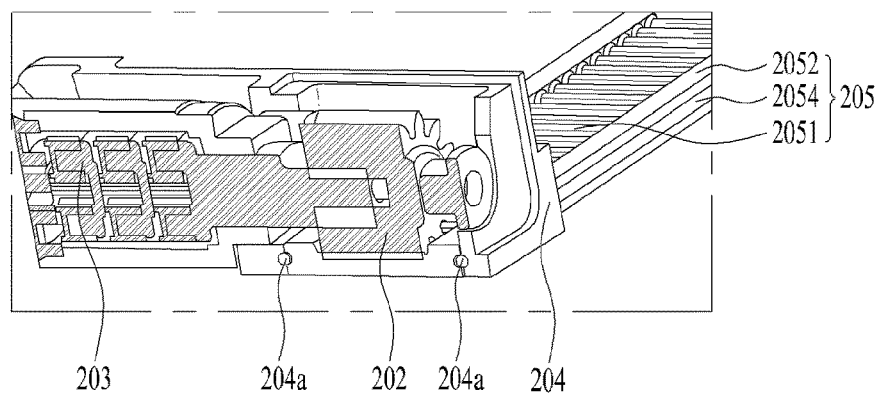
Figure 9:
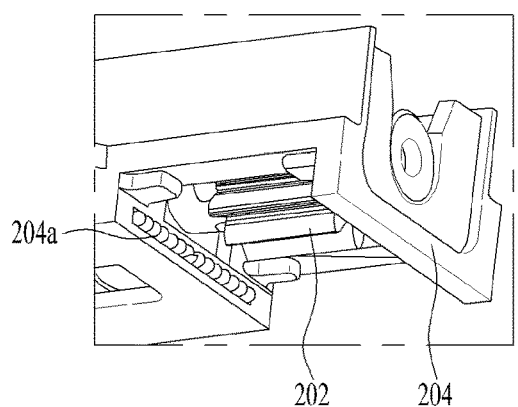

FIG. 9 is a view illustrating the driving unit 200 of the mobile terminal. The driving unit 200 includes the motor 201, the planetary gear and the pinion gear 202 for adjusting the number of rotations of the motor 201, the rack gear 202 that is engaged with the pinion gear 202 to receive rotational force and performs linear motion, and a motor housing 204 into which the motor 201, and the planetary gear and the pinion gear 202 are accommodated. FIG. 9(a) is a plan view of the driving unit, FIG. 9(b) is a cross-sectional view taken along line C-C of FIG. 9(a), and FIG. 9(c) is a perspective view illustrating the motor housing 204 and the pinion gear 202 when the rack gear 205 is removed.

The rack gear 205 has teeth formed on a surface facing the pinion gear 202 so as to be engaged with the pinion gear 202, and a plurality of teeth may be continuously formed in the first direction. The rack gear 2005 may further include edge portions 2052 without teeth formed on the left and right of the portion in which the teeth are formed.

The motor housing 204 exposes the pinion gear 202 so that the rack gear 205 and the pinion gear 202 contact and move. The motor housing 204 may further include a rack gear guide located at the rack gear 205 in the third direction so that the rack gear 205 does not shake in the third direction. The rack gear guide guides the sliding movement direction of the rack gear 205 by contacting the edge portions 2052 of the rack gear 205 described above. However, when the rack gear guide and the rack gear 205 contact each other, there is a problem in that friction occurs during sliding movement and the driving force of the driving unit 200 is reduced.

In order to reduce friction between the rack gear guide and the rack gear 205, a bearing may be provided as shown in FIGS. 9(b) and 9(c). The bearing includes a plurality of bearing balls 204a. The bearing balls 204a reduce friction by rotating when the rack gear 205 slidably moves between the rack gear guide and the edge portions 2052 of the rack gear 205. A ball rail 2054 including a corresponding curved surface of the bearing balls 204a may be formed on the side surface of the rack gear 205 and the gear guide so that the bearing balls 204a do not escape.

Figure 10:
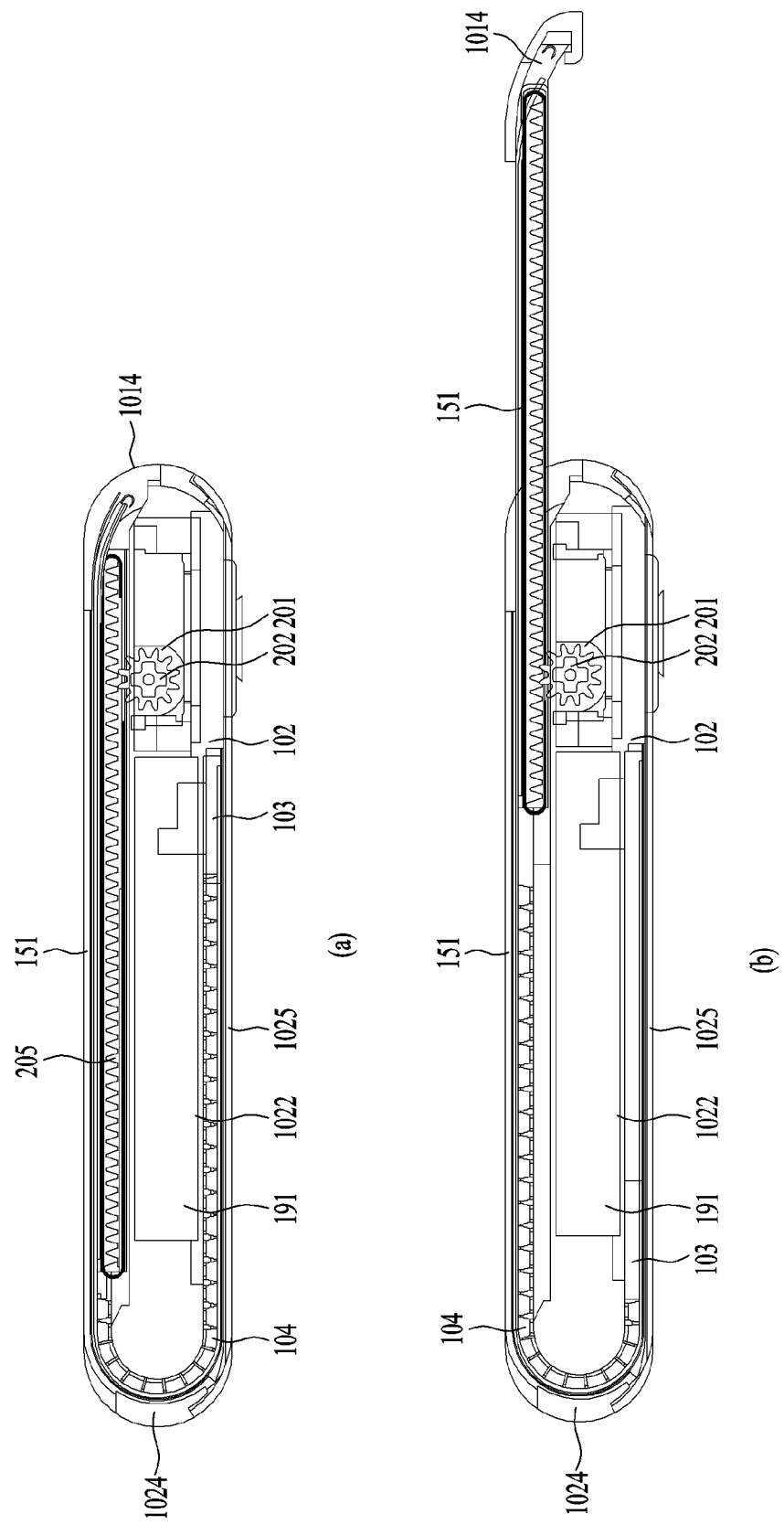
FIG. 10 is a cross-sectional view taken along lines A-A and B-B of FIG. 2.

Although the driving unit 200 having one motor 201 is shown in the figure, an embodiment is applicable even when two motors 201 are provided as shown in FIG. 7. If the bearing balls 204a and the ball rail 2054 are applied to the gear guild, the linear guide 203 may be replaced with the gear guide. FIG. 10 is a cross-sectional view taken along lines A-A and B-B of FIG. 2. As shown in FIG. 2, when the second frame 102 switches to the second state while moving in the first direction, the second region 151b located backward moves forward. In this case, a structure supporting the rear face of the second region 151b that has moved forward is required. Since the front portion 1021 positioned on the front face of the second frame 102 may be located on the rear face of the second region 151b in the second state but may be disposed on the rear face of the first frame 101 in the first state, the front face of the first frame 101 and the front face of the second frame 102 form a stepped difference in the second state.

There may be a boundary between the first region 151a and the second region 151b of the flexible display unit 151 due to the stepped difference between the front face of the first frame 101 and the front face of the second frame 102. In order to fill a separate space between the front portion 1021 of the second frame and the second region 151b of the flexible display unit 151 and maintain a flat surface of the second region 151 without sagging, a rolling hinge 104 located on the rear face of the second region 151b may be provided.

The rolling hinge 104 may be located on the rear face of the second region 151b and may have a thickness corresponding to a separate space between the front portion 1021 of the second frame 102 and the second region 151b of the flexible display unit 151 in the second state. As shown in FIG. 10(a), in the first state, the rolling hinge 104 may be rolled by the roller and positioned on the front, side and rear faces of the mobile terminal 100.

As shown in FIG. 10(a), in the first state, the flexible display unit 151 and the rolling hinge 104 may be located between the rear portion 1022 of the second frame 102 and the rear cover 1025 covering the rear face portion of the display unit 151.

As shown in FIG. 10(b), when the display unit 151 switches to the second state, the rolling hinge 104 moves forward together with the second region 151b and may be positioned on the front portion of the second frame 102.

Since the second region 115b of the display unit 151 in which the rolling hinge 104 is located is a portion in which bending deformation occurs when the display unit 151 switches from the first state to the second state, the rolling hinge 104 may also be deformed due to deformation of the second region 115b. Moreover, the rolling hinge 104 should have predetermined rigidity to maintain a flat state of the display unit 151 when the flexible display unit 151 is positioned on the front or rear face of the mobile terminal. That is, the rolling hinge 104 needs to have a structure capable of maintaining a flat state in the third direction and generating bending deformation in the first direction.

Figure 11:
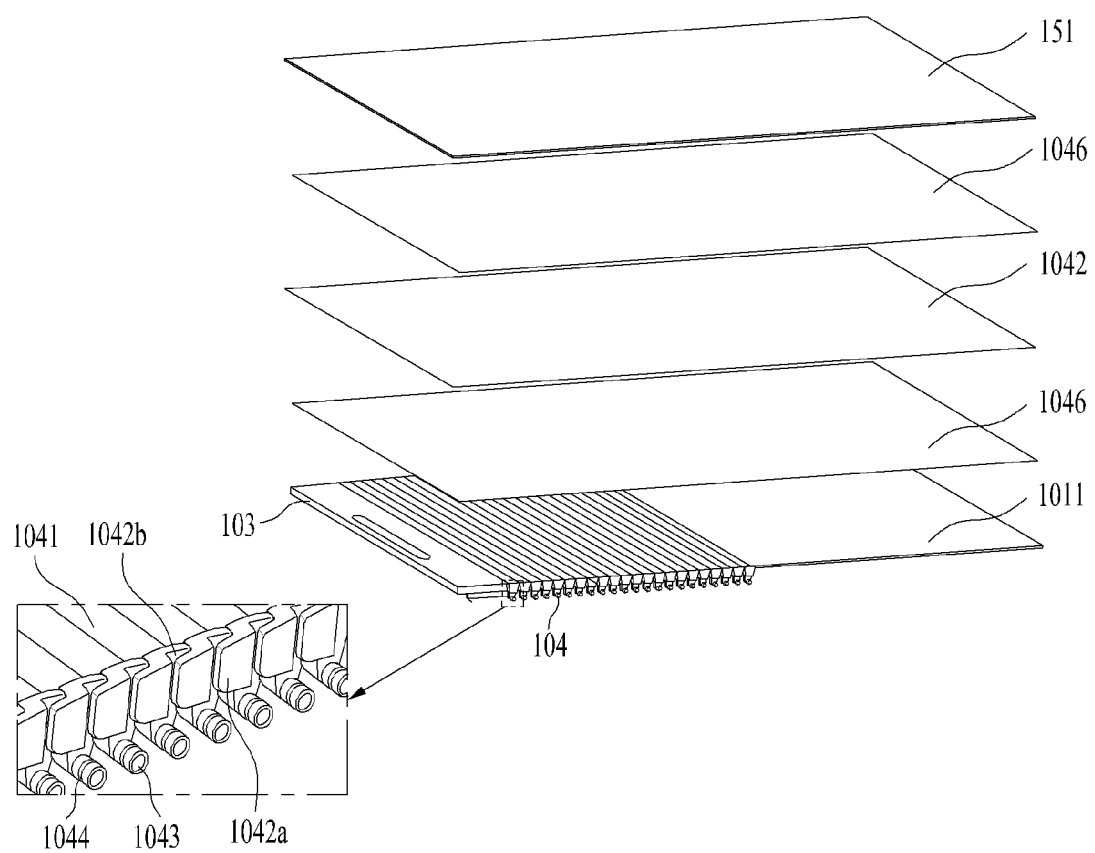
FIG. 11 is a view illustrating a display unit and a rolling hinge of the mobile terminal in accordance with an embodiment.

FIG. 11 is a view illustrating a display unit 151 and a rolling hinge 104 of the mobile terminal 100 in accordance with an embodiment. The rolling hinge 104 may include multiple support bars 1041 extending in the third direction. The multiple support bars 1041 may be arranged side by side in the first direction and spaced apart from each other by a predetermined distance. Accordingly, even when the flexible display unit 151 is rolled around the roller and is thus bent, interference between the support bars 1041 may be avoided. The support bars 1041 may be implemented with an injection molding material having a predetermined thickness for stiffness, and may include materials such as SUS or ferrosilicon (FeSi).

The multiple support bars 1041 may be directly attached to the rear surface of the display unit 151. However, this operation may take a long time and produce a lot of defects, resulting in poor productivity. In addition, directly processing the display unit 151 is highly likely to damage the display unit 151. Therefore, a rolling sheet 1045 to fix the multiple support bars 1041 may be further provided. The rolling sheet 1045 may include a metal material, and may employ a superelastic material that is bending-deformable and capable of recovering the flat state after the bending deformation. For example, a superelastic metal sheet such as a thin STS sheet of 0.05 mm or less may be used. An adhesive tape may be attached to both surfaces of the rolling sheet 1045 to bond the rolling sheet 1045 to the support bars 1041 and bond the rear surface of the display unit 151 to the rolling sheet 1045.

The rolling sheet 1045 may be provided with a kerf pattern in which multiple grooves extending in the third direction are formed in the first direction. The grooves in the kerf pattern may be formed between the multiple support bars 1041. The grooves may be formed on a surface of the rolling sheet 1045 to which the support bars 1041 are bonded. The kerf pattern may be formed in a wedge shape that is formed by being gradually narrowed from the surface portion of the rolling sheet 1045.

Instead of the rolling sheet 1045, an elastic material such as silicone may be disposed between the support bars 1041 to join neighboring support bars 1041. In this case, the angle between the support bars 1041 may be varied. The elastic connector may be bent at a position corresponding to the roller. When positioned on the front or rear of the mobile terminal, the elastic connector may be unfolded such that the support bars 1041 are disposed forming a flat surface.

The support bars 1041 may form a flat surface corresponding to the rear surface of the display unit 151. Alternatively, as shown in FIG. 8(*b*), the support bars 1041 may be formed in a shape having a predetermined curvature. The curved support bars 1041 may closely contact the curved surface of the roller when the rolling hinge 104 is rolled around the roller. Alternatively, one surface of the support bars 1041 in contact with the display unit 151 maintains a flat state, and the other surface thereof on the opposite side may include a curved surface corresponding to the curvature of the roller. In this case, the support bars 1041 may be thick at the ends thereof facing in the first and second directions and have the thinnest portion in the middle thereof.

The rolling hinge 104 may be disposed at a position corresponding to the second region 151*b* and is rolled and bent around the roller. Thus, the rolling hinge 104 may span over the front and rear surfaces. The rolling hinge 104 is arranged side to the first frame 101 on the front side and connected to the slide frame 103 on the rear side. In order for the flexible display unit 151 to form a continuous surface without a step, the first frame 101 positioned on the rear surface of the first region 151*a*, the slide frame 103 positioned on the rear surface of the third region 151*c*, and the rolling hinge 104 positioned on the rear surface of the second region 115*b* may be arranged such that the surfaces thereof in contact with the display unit 151 are at the same height. In particular, since the slide frame 103 moves on the rear of the mobile terminal 100 and moves in the same space as the rolling hinge 104, the rolling hinge 104 may have a thickness corresponding to the thickness of the slide frame 103.

Figure 12:
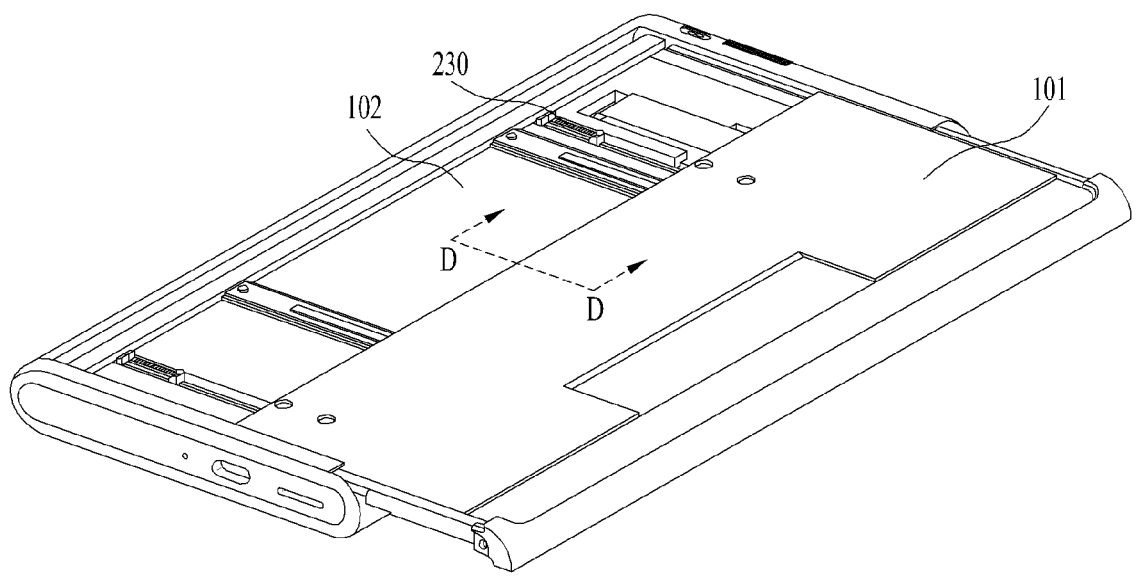
FIGS. 12 and 13 are views illustrating a first frame and a second frame in the second state of the mobile terminal.
Figure 12:
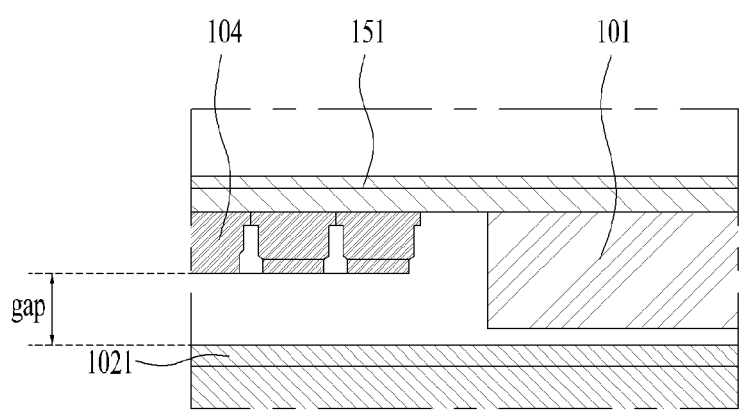
Figure 13:
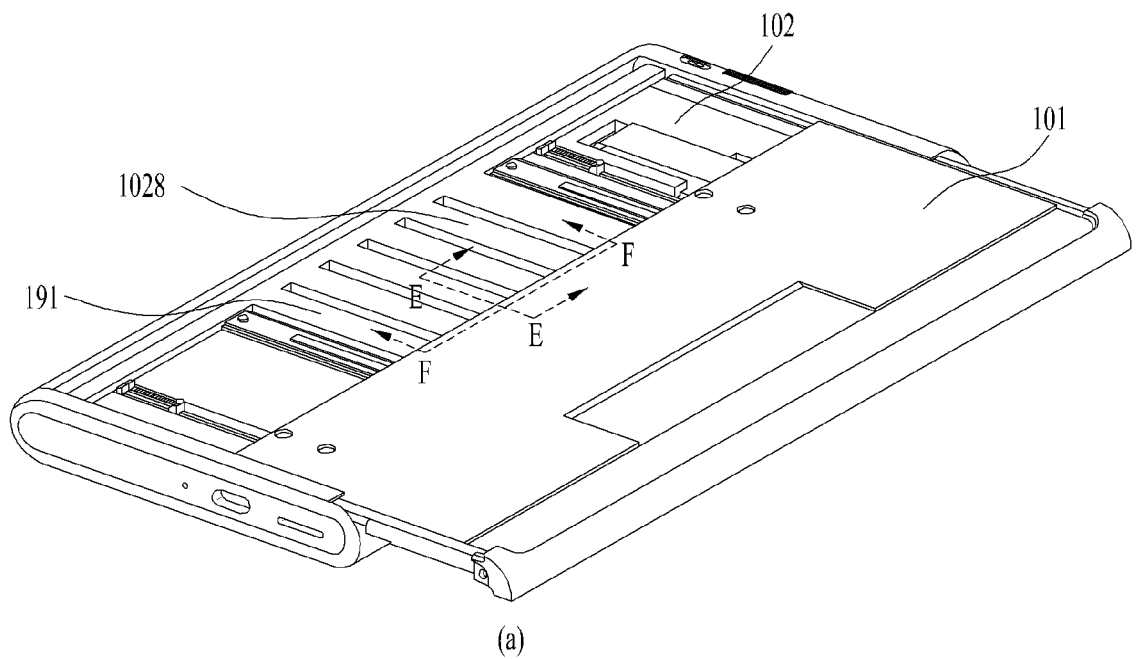
Figure 13:
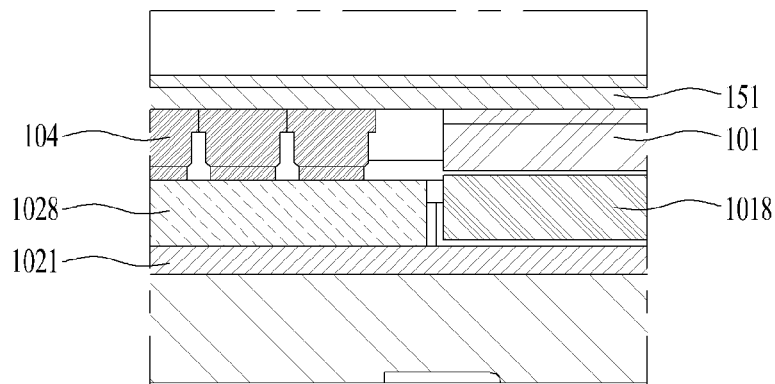
Figure 13:
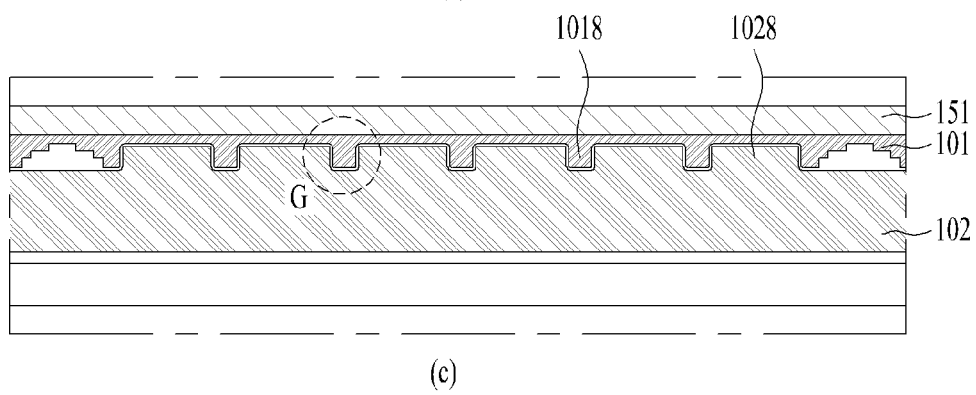

FIGS. 12 and 13 are views illustrating the first frame 101 and the second frame 102 in the second state of the mobile terminal 100. FIGS. 12(*a*) and 13(*a*) are views illustrating the first frame 101 and the second frame 102 when the display unit 151 is omitted. FIGS. 12(*b*) and 13(*b*) are cross-sectional views taken along line D-D of FIG. 12(*a*). FIG. 13(*c*) is a cross-sectional view taken along line F-F of FIG. 13(*a*).

Referring to FIG. 10, the first frame 101 has a plate shape without an internal space and the first frame 101 should support the first region in the second state by itself. When the first frame 101 is too thin, the first frame 101 may be weak in rigidity in the second state and thus the first frame 101 needs to have rigidity of a predetermined strength or more.

When the thickness of the first frame 100 is increased, a thickness difference Gap occurs between the rolling hinge 104 and the first frame 101 as shown in FIG. 12(*b*). Due to this thickness difference Gap, a sagging phenomenon may occur in the second region 151*b* and a boundary between the first region 151*a* and the second region 151*b* of the display unit 151 may be prominent on the display unit.

When the rolling hinge 104 is formed to be thick in correspondence to the thickness of the first frame 101, the radius of curvature at a portion that is bent while surrounding the second frame 102 should be increased. When the radius of curvature of the rolling hinge 104 increases, the mobile terminal 100 becomes thick.

Therefore, the first frame 101 needs to be configured so as not to generate a gap between the front portion of the second frame 102 and the rolling hinge 104 while securing the rigidity of the first frame 101. As an example, FIG. 13 shows a first support portion 1018 protruding from the rear face of the first frame 101 and a second support portion 1028 protruding from the front face of the second frame 102. A plurality of first support portions 1018 is separately disposed on the rear face of the first frame 101 in the third direction, and each of the first support portions 1018 is elongated in the first direction. The first support portions 1018 may secure rigidity of a predetermined strength or more even if the entire thickness of the first frame 101 is not increased.

The second support portion 1028 is positioned between the plurality of first support portions 1018 and is disposed not to overlap with the first support portion 1018 in the first direction. As shown in FIG. 13(*c*), the second support portion 1028 may be formed by fully filling a space between the first support portions 1018 and the second support portion 1028. Alternatively, the second support portion 1028 may include a separate space between the first support portion 1018 and the second support portion 1028 in the third direction. The first support portion 1018 and the second support portion 1028 do not overlap in the first direction and thus do not interfere with the movement of the first frame 101.

The height of the second support part 1028 in the thickness direction of the mobile terminal 100 may be formed to correspond to the height of the first support part 1018 in the thickness direction of the mobile terminal 100. The second support part 1028 supports the rear face of the rolling hinge 104 as shown in FIG. 13(*b*) to eliminate a gap between the rolling hinge 104 and the front portion of the second frame 102, so that the second region may be stably supported even in the second state without sagging backward.

Figure 14:
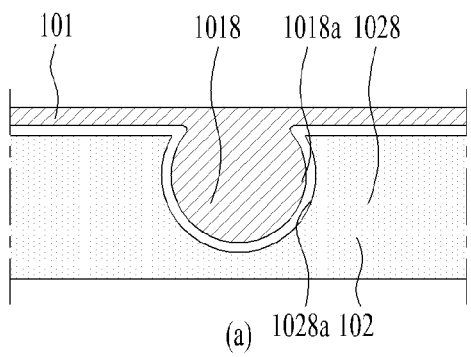
FIG. 14 is a cross sectional view of a first support portion and a second support portion of FIG. 13 facing in a third direction.
Figure 14:
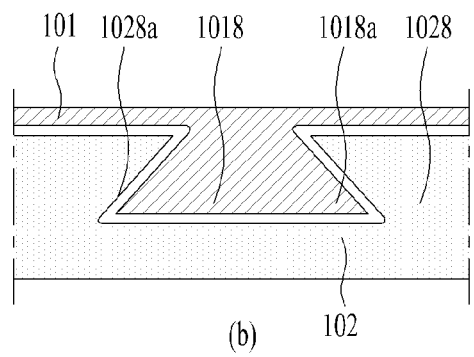
Figure 14:
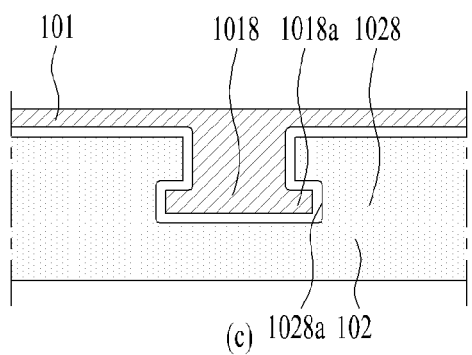
Figure 14:
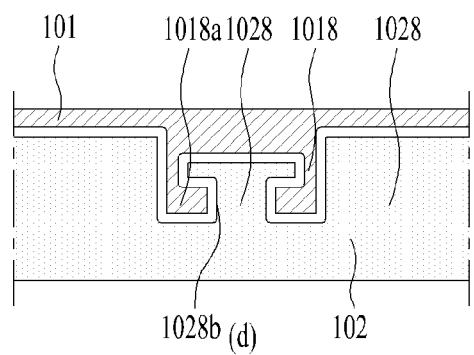

FIG. 14 is an enlarged view of portion G of FIG. 13(*c*) as an embodiment of a cross section of the first support portion 1018 and the second support portion 1028 of FIG. 13 facing in the third direction. When the first frame 101 slidably moves, the first frame 101 is prevented from being distorted by the first support portion 1018 and the second support portion 1028 to implement the linear guide 230. In order for to the first support 1018 and the second support 1028 to perform the function of the linear guide 230, the second support 1028 may be configured in a shape of surrounding the first support portion 1018 at both sides facing in the third direction as shown in FIG. 14.

The cross-section of the first support portion 1018 facing in the third direction may be rectangular as shown in FIG. 13(c) or may be circular or trapezoidal.

As shown in FIG. 14(c), a concavo-convex portion protruding in the third direction from an end of the first support portion 1018 in the thickness direction may be formed. As shown in FIG. 14(d), the plurality of first support portions 1018 and the plurality of second support portions 1028 may have different shapes.

When the width of the cross section of the first frame 101 increases or is bent as the distance from the rear face of the first frame 101 increases, the third frame 101 and the second frame 102 may be prevented from being separated in the thickness direction of the mobile terminal, so that the fastening force between the first frame 101 and the second frame 102 as well as twisting in the third direction may be increased.

Figure 15:
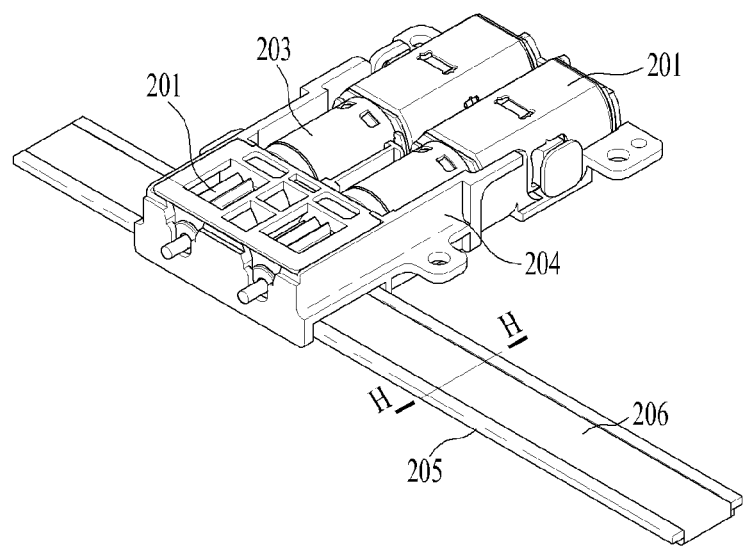
FIGS. 15 and 16 are views illustrating an embodiment of a gear cover of the mobile terminal.
Figure 15:
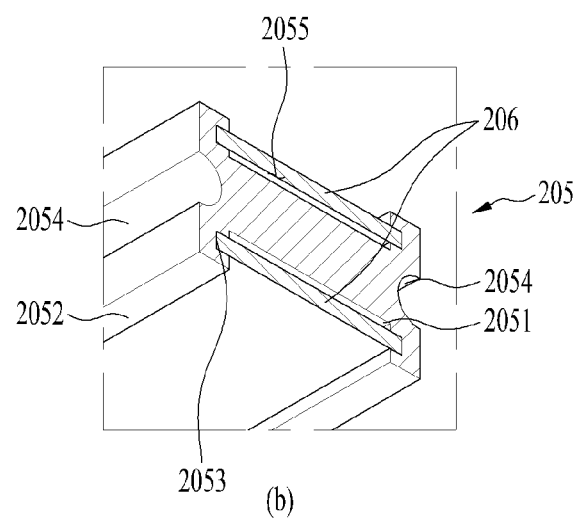
Figure 16:
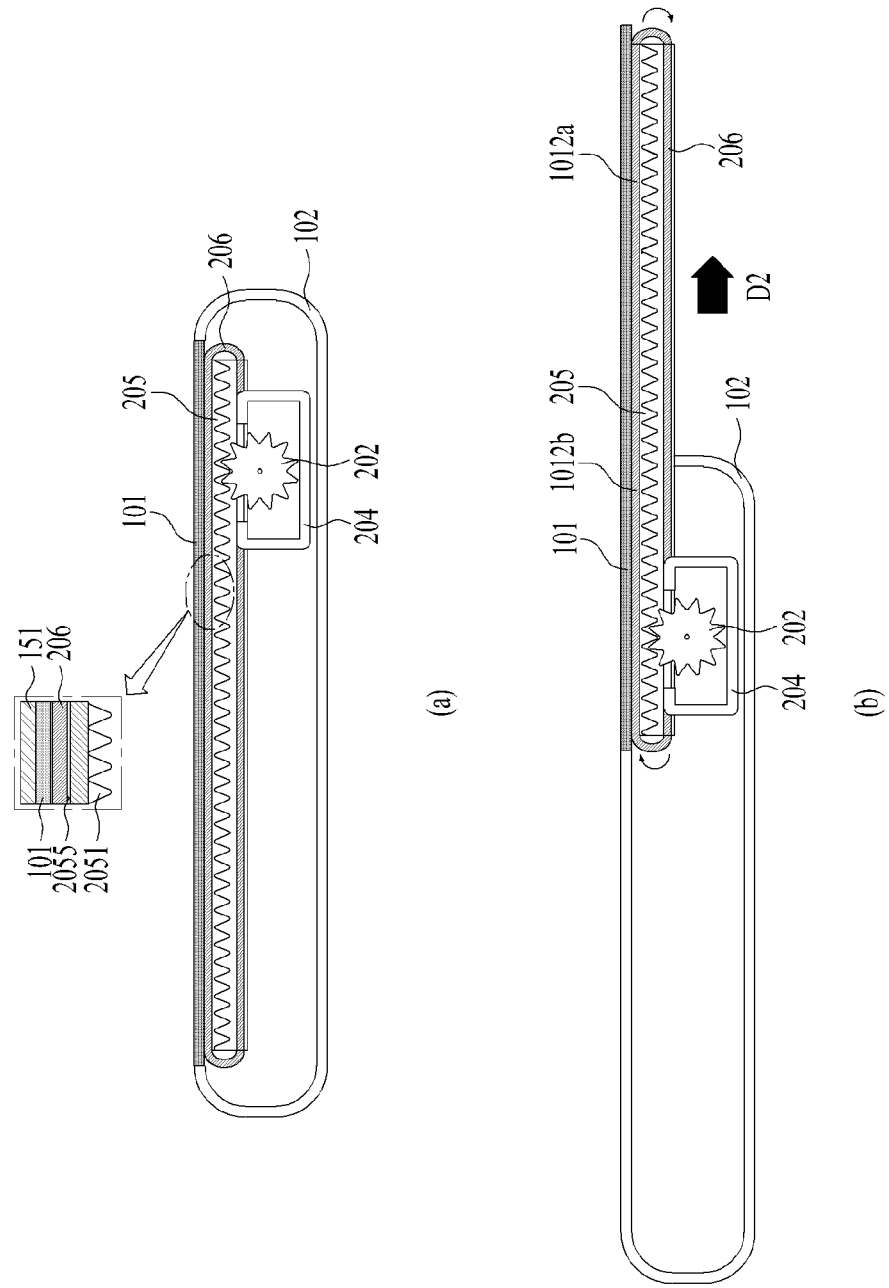

FIGS. 15 and 16 are views illustrating an embodiment of a gear cover of the mobile terminal. Referring to FIG. 3(b), when the first frame 101 moves from the front face of the second frame 102 in the second direction in order to switch to the second state, the rear face of the first frame 101 is exposed. In the second state, the rear face exposed to the outside by releasing a state of overlapping with the second frame 102 is referred to as a first rear face 1012a and a portion in which the overlapping state is maintained is referred to as a second rear surface 1012b.

The first region of the display unit 151 is located in the front face of the first frame 101 and the rack gear 205 is located in a rear direction of the first frame 101. Generally, components may be located inside a frame. However, since the rack gear 205 should be driven by being engaged with the pinion gear 202 mounted in the second frame 102, a toothed portion 2051 of the rack gear 205 is exposed in the rear direction of the first frame 101.

In the first state, the rack gear 205 is not exposed because the second frame 102 is located on the rear face of the first frame 101 but, in the second state, there is a problem in that the rack gear 205 is exposed to the outside. Since the length of the rack gear 205 corresponding to a sliding movement distance of the body should be secured, the rack gear 205 is exposed in the rear direction of the first frame 101.

Since the rack gear 205 moves in engagement with the pinion gear 202, foreign substances adhere well when lubricant such as grease is applied for operability. Then, there is a problem that foreign substances such as dust are introduced into the mobile terminal 100. In addition, there is a risk of injury to the user when the hand touches the concavo-convex portion of the rack gear 205.

A gear cover 206 may further be provided to cover the rack gear 205 exposed to the outside. The gear cover 206 may be formed of a bending-deformable material such as silicone or fabric. Alternatively, the gear cover 206 may use a metal plate that is not easily damaged in consideration of durability.

The gear cover 206 may be extended in parallel to a length direction of the rack gear 205. The gear cover 206 may cover the whole rack gear 205 or cover only the toothed portion 2051 except for the edge portions 2052 positioned on the left and right of the toothed portion 2051 as shown in FIG. 15(a). The edge portions 2052 are portions fastened to the rack gear guide as described above and may include a groove in which the bearing is positioned as shown in FIG. 15(b).

FIG. 15(b) is a cross-sectional view taken along line H-H of FIG. 15(a) and a cover rail 2052 in which the gear cover 206 is inserted into. An end of the gear cover 206 facing in the third direction is fitted into a cover rail 2053 of the edge portions 2052 so that the cover rail 2053 may be fastened the gear cover 206 to slidably move with respect to the rack gear 205 in the first direction.

The gear cover 206 sequentially covers a portion to which the rack gear 205 is exposed backward in the second state when the rack gear 205 moves in the second direction.

As shown in FIG. 16, when the mobile terminal is switched from the first state to the second state, the length of the rack gear 205 located in the second direction from the pinion gear 202 gradually increases. As the length of the rack gear 205 located in the second direction from the pinion gear 202 increases, the position of the gear cover 206 on the rack gear 205 is also changed.

The gear cover 206 covers the toothed side of the rack gear 205. However, a position at which the rack gear 205 is engaged with the pinion gear 202 should be opened. Since the position at which the rack gear 205 is engaged with the pinion gear 202 on the rack gear 205 is changed, the position of the gear cover 206 is also changed correspondingly.

In the embodiment shown in FIG. 16, the gear cover 206 is bent at ends of the rack gear 205 facing in the first direction and the second direction and surrounds the rack gear 205 to cover the other side of the rack gear 205. Both ends of the gear cover 206 may be fixed to both sides of the pinion gear 202. The positions of the both ends of the gear cover 206 may be fixed to the second frame 102 but the positions of the both ends of the gear cover 206 on the rack gear 205 may be changed as a bending position of the gear cover 206 is changed.

The gear cover 206 moves along the cover rail 2053, and the ends of the rack gear 205 facing in the first direction and the second direction may have curved surfaces or include small rollers so that the gear cover 206 is not folded and is bent along a curved line at both ends of the rack gear 205.

A cover channel 2055 may be provided so that the gear cover 206 may pass in the front direction of the rack gear 205. The cover channel 2055 is a space between the rack gear 205 and the first frame 101. As shown in FIG. 15(b), the cover channel 2055 having a space corresponding to the width of the gear cover 206 is provided at both sides thereof with the cover rail 2053 to guide sliding movement of the gear cover 206 on the rack gear 205.

Both ends of the gear cover 206 may be directly coupled to the second frame 102 or may be fixed to the second frame 102 by being coupled to a gear housing that fixes the pinion gear 202 to the second frame 102 as shown in FIG. 16.

Figure 17:
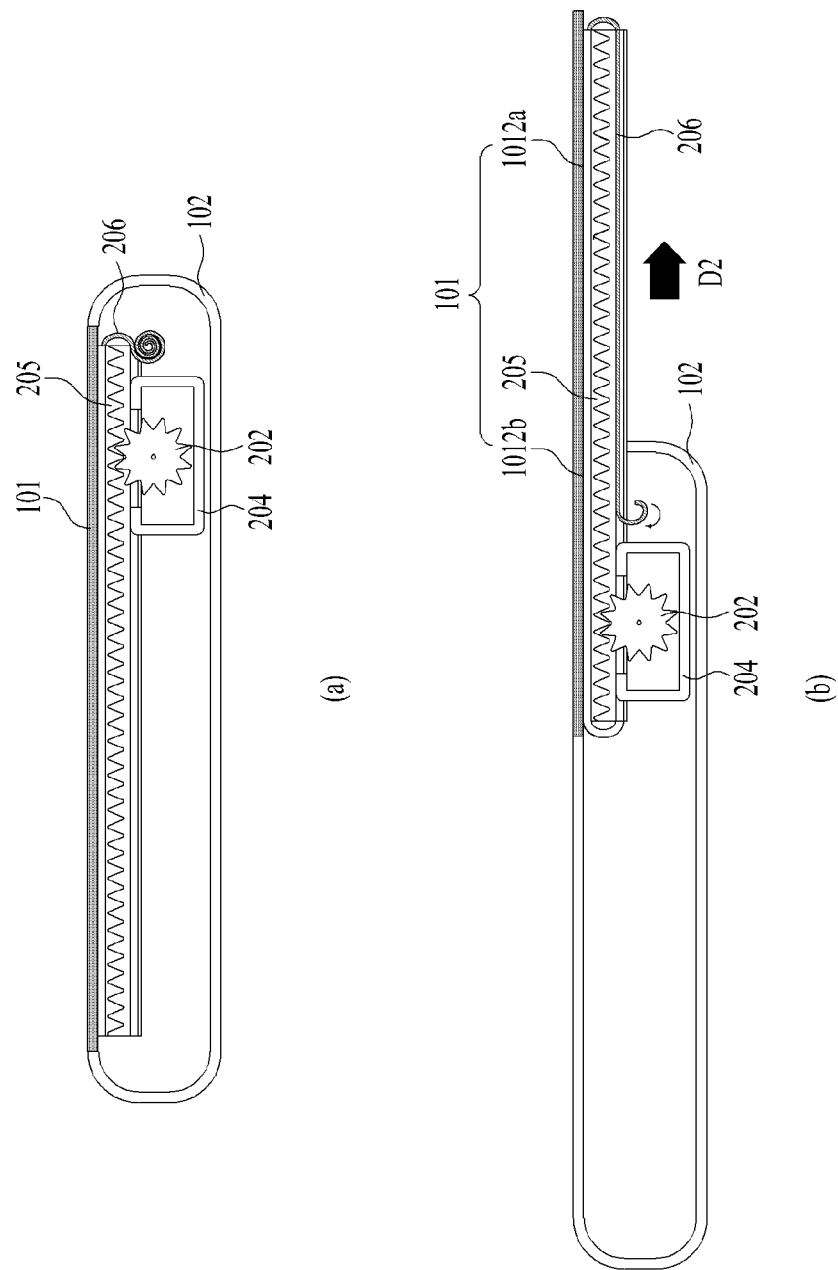
FIG. 17 is a view illustrating another embodiment of the gear cover of the mobile terminal.

FIG. 17 is a view illustrating another embodiment of the gear cover 206 of the mobile terminal. One end of the gear cover 206 may be coupled to an end of the rack gear 205 facing in the second direction, and the other end thereof may be located inside the second frame 102. In the first state, the gear cover 206 may be rolled and inserted as shown in FIG. 17(a) and, in the second state, the gear cover 206 may be released as shown in FIG. 17(b).

The gear cover 206 may use a spiral spring formed by bending a metal plate or may be rolled or unrolled using driving force of the driving unit 200. When the rack gear 205 slidably moves, the pinion gear 202 also rotates, and the gear cover 206 may be inserted into the second frame 102 by rolling the other end of the gear cover 206 using a reel (not shown) that rotates at the same time as when the pinion gear 202 rotates.

FIGS. 18 to 25 are cross-sectional views taken along lines A-A and B-B of FIG. 2, illustrating various embodiments of the driving unit 200. The rack gear 205 may not be located at the first rear face 1012a on the rear face of the first frame 101 and may be located only at the second rear face 1012*b* so that the rack gear 205 may be configured not to be exposed to the outside.

However, since the rack gear 205 should maintain an engaged state with the pinion gear 202 to enable sliding movement, a section except for an overlapping section in which the rack gear 205 is engaged with the pinion gear 202 corresponds in length to a section in which the rack gear 205 may move the first frame 101.

For example, if the length of the first frame 101 facing in the first direction is 6.5 cm and the length of the rack gear 205 is 4.5 cm in the case in which the size of the overlapping section of the rack gear 205 and the pinion gear 202 is 0.5 cm, then the first frame 101 may move 4 cm. In this case, since the length of the second rear face 1012*b* is 2.5 cm, the length of the rack gear 205 exposed to the outside in the second state is 2 cm. In order to solve this problem, the length of the rack gear 205 may be shortened to 3.5 cm. The rack gear 205 is not exposed to the outside in the second state but the distance by which the first frame 101 is movable is only 3 cm and thus expandability of the mobile terminal is deteriorated.

Figure 18:
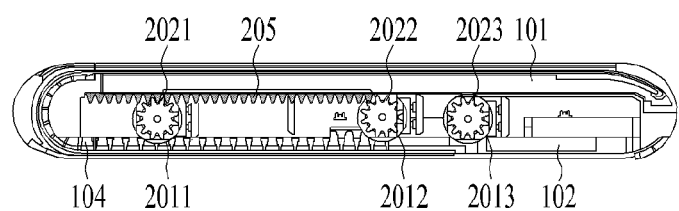
FIGS. 18 to 25 are cross-sectional views taken along lines A-A and B-B of FIG. 2, illustrating embodiments of the driving unit.
Figure 18:
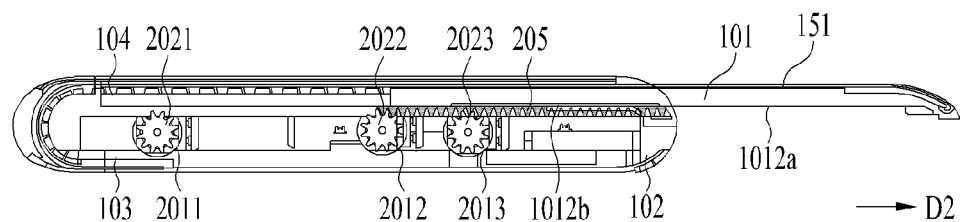

In order to secure the movement distance of the first frame 101 and to prevent the rack gear 205 from being exposed to the outside in the second state, a plurality of pinion gears 2021, 2022, and 2023 may be disposed separately in the first direction as shown in FIG. 18. Motors 2011, 2012, and 2013 corresponding in number to the pinion gears 2021, 2022, and 2023 may be provided and should be kept engaged with at least one or more of the pinion gears 2021, 2022, and 2023.

Unless a plurality of driving units 200 is included in the third direction, since driving force of two or more of the pinion gears 2021, 2022, and 2023 is required to move the first frame 101 with sufficient force, an interval between the pinion gears 2021, 2022, and 2023 may be arranged to be shorter than the length of the rack gear 205 so that the rack gear 205 is engaged with two or more of the pinion gears 2021, 2022, and 2023. In this way, even if a short rack gear 205 is used by arranging, in the first direction, the plurality of motors 2011, 2012, and 2013 and the plurality of pinion gears 2021, 2022, and 2023 that provide driving force to one rack gear 205, the moving distance of the first frame 101 may be secured.

Even in this case, the length of the rack gear 205 becomes longer in order to maintain the state in which the rack gear 205 is engaged with the at least two of the pinion gears 202. A gear chain 2025 may be provided so that the force of the two motors 201 may be transmitted to the rack gear 205 even in the state in which the rack gear 205 is engaged with one pinion gear 202.

Figure 19:
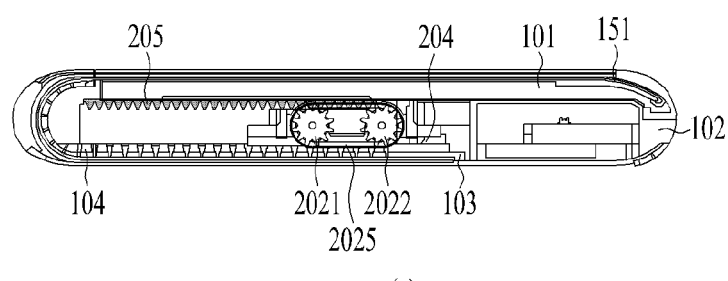
Figure 19:
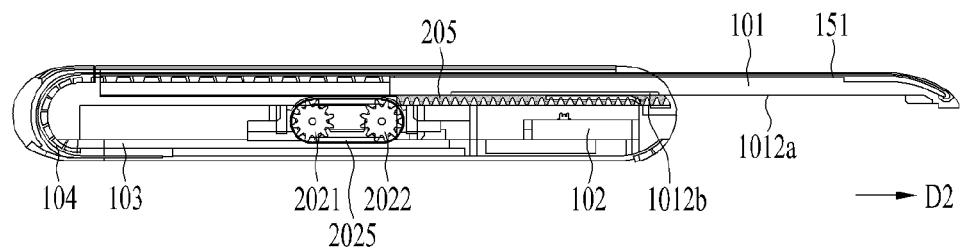

FIG. 19 illustrates an embodiment including the gear chain 2025. The first pinion gear 2021 and the second pinion gear 2022 are surrounded with the gear chain 2025 to establish synchronization of the pair of pinion gears 202.

Synchronization means matching the number of rotations of a plurality of entities to be the same. Although the rotational speeds of the two pinion gears 202 may be adjusted to be the same by adjusting the number of rotations of the pair of motors 201, the force of the pair of motors 201 may be synchronized using the gear chain 2025 and the rotational force of the second motor 2012 may be transmitted to the first pinion gear 2021 (or vice versa).

The gear chain 2025 may surround the first pinion gear 2021 and the second pinion gear 2022 to connect the first pinion gear 2021 and the second pinion gear 2022. The gear chain 2025 synchronizes the rotational speeds of the first pinion gear 2021 and the second pinion gear 2022. Even when the rack gear 205 is engaged with the first pinion gear 2021, the rack gear 205 may receive the power of the second motor 2012 through the gear chain 2035.

In this case, the length of the rack gear 205 may be shortened since the rack gear 205 need not maintain a state of being engaged with the pair of pinion gears 202. When the interval between the pair of pinion gears 202 is wider, the length of the rack gear 205 may be reduced by the interval of the pinion gears 202, so that the rack gear 205 is not exposed in the second state.

However, when the driving unit 200 has three or more motors 201 or when the interval between the pair of motors 201 is separated, a space occupied by the motor 201 and the pinion gear 202 increases.

Figure 20:
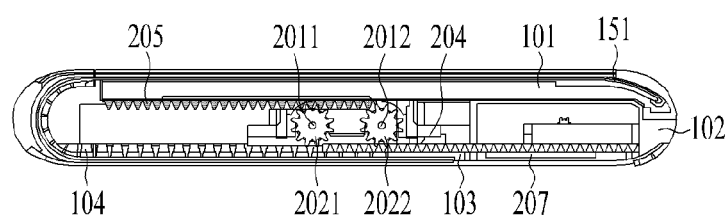
Figure 20:
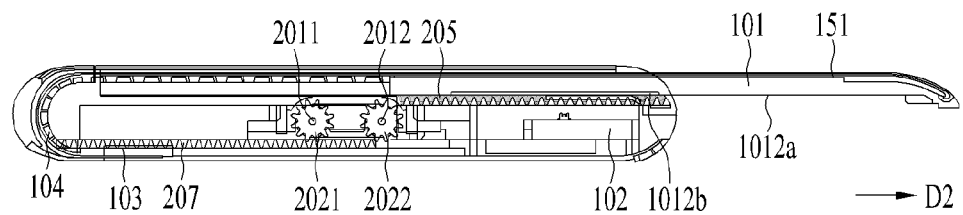

FIG. 20 illustrates an auxiliary rack gear 207 that is coupled to the slide frame 103 to move along the slide frame 103 and moves in the opposite direction to the rack gear 205. The auxiliary rack gear 207 slidably moves in engagement with the pinion gear 202 in an opposite direction to the rack gear 205 and the rack gear 205 and the auxiliary rack gear 207 move in opposite directions.

In this embodiment, the pair of motors 201 and the pair of pinion gears 202 are arranged in parallel in the first direction, and the rack gear 205 coupled to the rear face of the first frame 101 to be positioned on the front of the pinion gear 202 and the auxiliary rack gear 207 coupled to the front face of the pinion gear 205 to be positioned at the rear face of the pinion gear 202 are provided.

As shown in FIG. 20(*a*), in the first state, the rack gear 205 may be engaged with the first pinion gear 2021 located in the first direction among the pinion gears 202, and the auxiliary rack gear 207 may be engaged with the second pinion gear 2022 located in the second direction among the pinion gears 202. The rack gear 205 engaged with the first pinion gear 2021 receives only the driving force of the first motor 2011, and the second motor 2012 may not directly transmit force thereof to the rack gear 205. However, the second motor 2012 may provide driving force to the auxiliary rack gear 207 through the second pinion gear 2022 while being engaged with the auxiliary rack gear 207. The first motor 2011 moves the rack gear 205 and the second motor 2012 moves the auxiliary rack gear 207. As a result, force of the two motors 201 is transmitted for the sliding movement of the mobile terminal.

When there is no auxiliary rack gear 207 as shown in FIG. 7, driving force moving up to the first frame 101, the display unit 151, and the slide frame 103 is provided through the rack gear 205 by transmitting the force of the pair of motors 201. To receive the force of the pair of motors 201, the rack gear 205 should always be kept engaged with the pair of pinion gears 202.

However, in this embodiment, since each of the motors 201 may transmit force through the auxiliary rack gear 207 or the rack gear 205, the length of the rack gear 205 may be configured to be shortened as compared with the embodiment of FIG. 7. Since the rack gear 205 may be located in a hidden rear face, the moving distance of the first frame 101 may be secured even if the rack gear 205 is not extended to an exposed rear face.

In the second state, only the auxiliary rack gear 207 may be disposed in a state of being engaged with the first pinion gear 2021 as shown in FIG. 20(*b*). When the second state ends, speed decreases. When the second state is switched to the first state, the slide frame 103 moves in the second direction by the auxiliary rack gear 207, and force is transmitted since the first frame 101 and the rack gear 205 are pulled in the first direction. If the rack gear 205 is moved up to the second pinion gear 2022, the first frame 101 and the slide frame 103 may slidably move by receiving the driving force of the second motor 2012.

Figure 21:
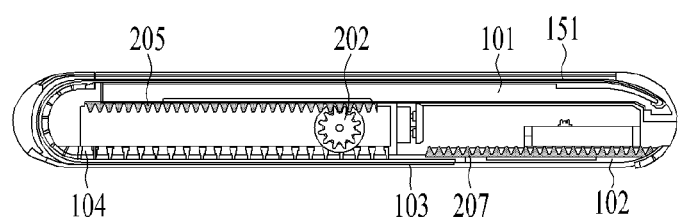
Figure 21:
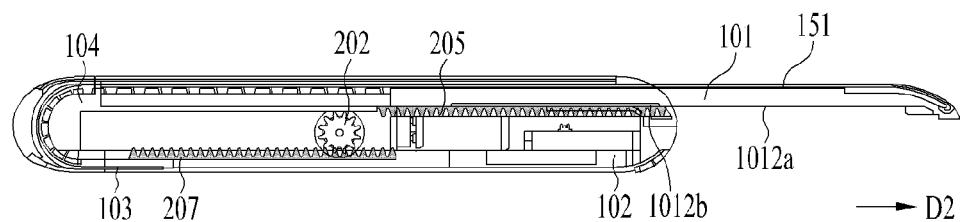

FIG. 21 is an embodiment including the rack gear 205 and the auxiliary rack gear 207. Although only one pinion gear 202 is shown in FIG. 21, the embodiment may be applied even when a pair of pinion gears is provided as shown in FIG. 20. When one motor 201 is provided, a pair of driving units 200 may be disposed in the third direction as shown in FIG. 8 to provide sufficient force to the first frame 101.

In this embodiment, as shown in FIG. 21(a), only the rack gear 205 is engaged with the pinion gear 202 in the first state. While the first frame 101 moves in the second direction, the auxiliary rack gear 207 fastened to the slide frame 103 approaches the pinion gear 202 and is engaged with the pinion gear 202 on the rear face of the pinion gear 202. As the first frame 101 moves, the engaged state of the rack gear 205 and the pinion gear 202 is released and, in the second state, only the pinion gear 202 and the auxiliary rack gear 207 are engaged, as shown in FIG. 21(b).

Figure 22:
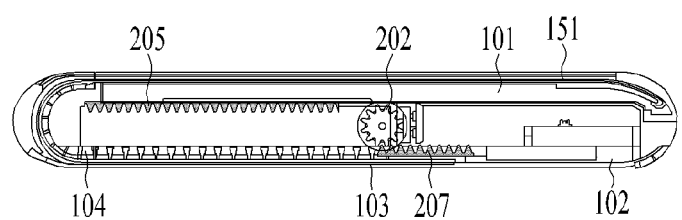
Figure 22:
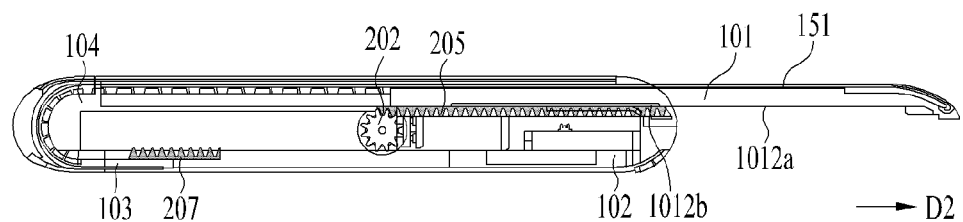

Conversely, as shown in FIG. 22, in the first state, only the auxiliary rack gear 207 may be engaged with the pinion gear 202 to directly receive the rotational force of the pinion gear 202 (FIG. 22(a)) and, in the second state, only the rack gear 205 may be engaged with the pinion gear 202 to directly receive the rotational force of the pinion gear 202 (FIG. 22(b)). This may vary depending on the length of the rack gear 205 and the position of the pinion gear 202.

That is, when at least one of the rack gear 205 and the auxiliary rack gear 207 is kept engaged with the pinion gear 202, since force is transmitted to the first frame 101, the slide frame 103, and the flexible display unit 151 that are connected, the first frame 101, the slide frame 103, and the flexible display unit 151 may slidably move by receiving the driving force of the motor 201.

Figure 23:
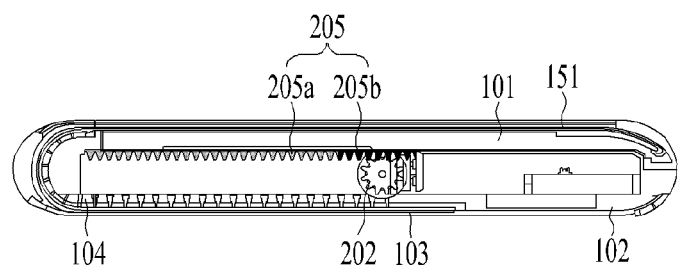
Figure 23:
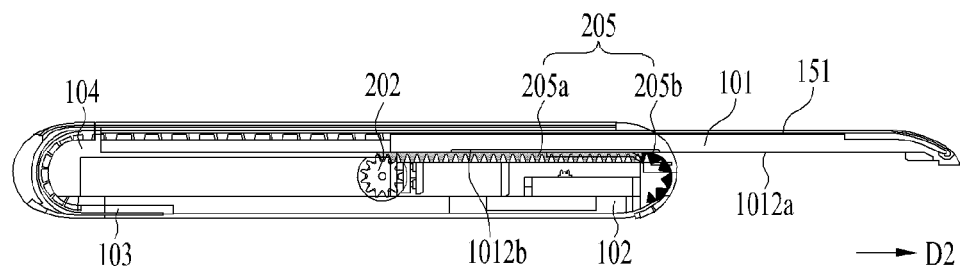
Figure 24:
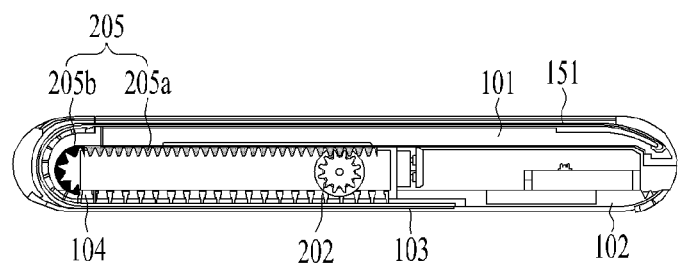
Figure 24:
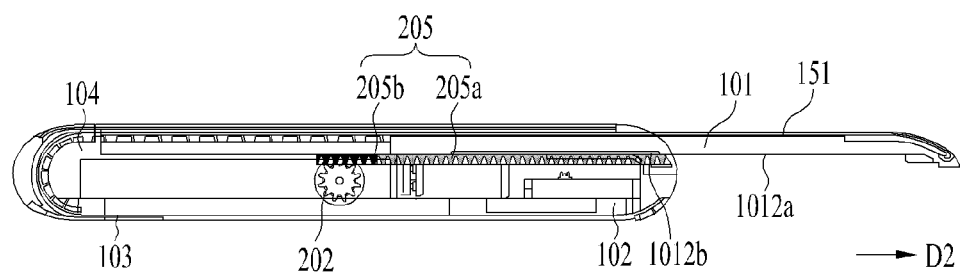
Figure 25:
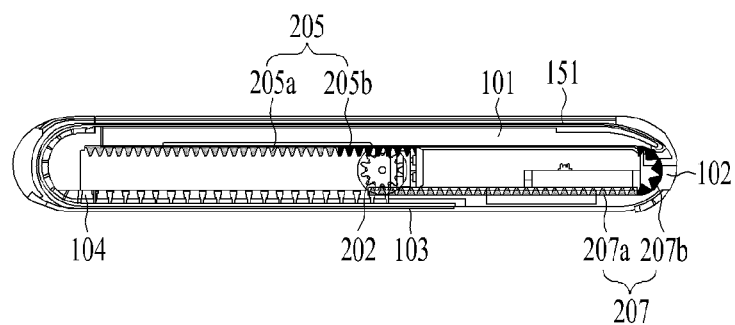
Figure 25:
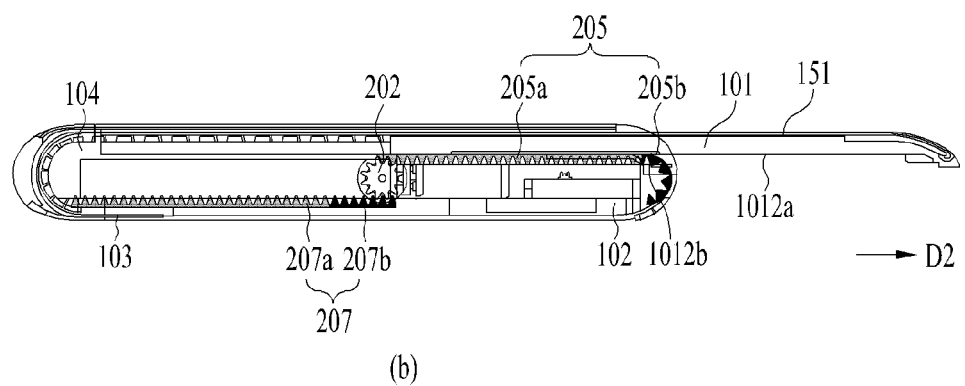

FIGS. 23 to 25 illustrate embodiments of the mobile terminal including the rack gear 205 including a flexible gear 205b. As shown in FIGS. 23 and 24, the rack gear 205 includes a fixed gear 205a located on the second rear face 1012b of the first frame 101 and the flexible gear 205b located on one side of the fixing gear 205a. The flexible gear 205b may be extended in the first direction in a state in which the flexible gear 205b is engaged with the pinion gear 202 as shown in of FIG. 23(a) but may maintain a state of being located inside the second frame 102 by being bent as shown in FIG. 23(b).

The flexible gear 205b may not be fixed to the first frame 101 and may have a shape connected to an end of the fixed gear 205a. The flexible gear 205b may be located at an end of the rack gear 205 facing in the second direction as shown in FIG. 23 and may be located at the end of the rack gear 205 facing in the first direction as shown in FIG. 24.

In the former, the flexible gear 205b is bent in the second state as shown in FIG. 23(b) and, in the latter, the flexible gear 205b is bent in the first state as shown in FIG. 24(b).

A curved guide may be included in the second frame 102 to guide the bending deformation of the flexible gear 205b so that the flexible gear 205b may be bent. The flexible gear 205b may be bent while curving along the curved guide and may maintain a state located inside the second frame 102.

When the auxiliary rack gear 207 is provided as shown in FIG. 25, the auxiliary rack gear 207 is also provided with a flexible gear 207b so that the rotational force of the motor 201 may be guided to be applied to both the first frame 101 and the slide frame 103. As shown in FIG. 25, when a state in which the rack gear 205 and the auxiliary rack gear 207 are always engaged with the pinion gear 202 is maintained, the movement of the first frame 101 and the movement of the slide frame 103 are synchronized. Then, the first frame 101 and the slide frame 103 symmetrically move based on the pinion gear 202, so that the display unit 151 may be prevented from being lifted.

In addition, switching from the second state to the first state as well as switching from the first state to the second state may be stably implemented.

Figure 26:
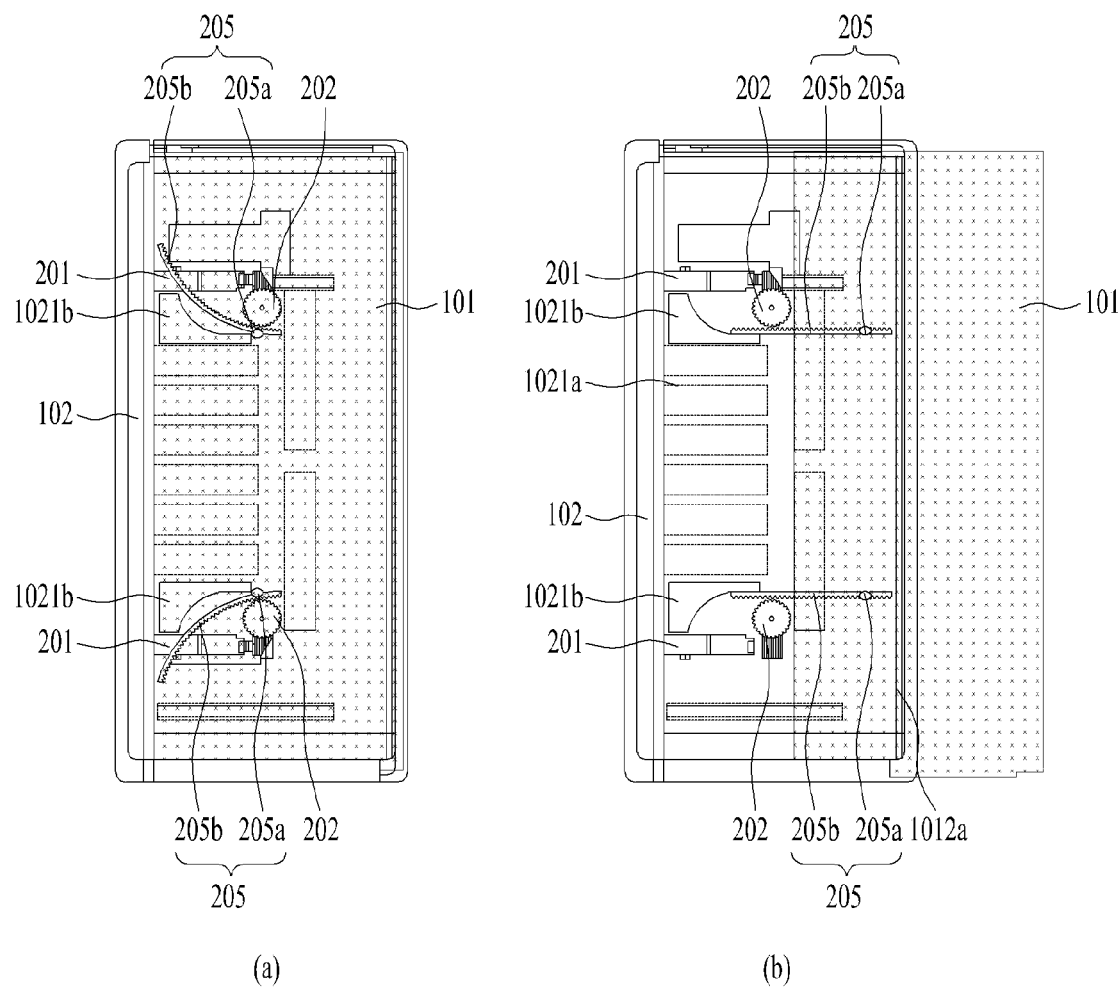
FIGS. 26 and 27 are front views illustrating a first state and a second state when the flexible display unit is omitted.
Figure 27:
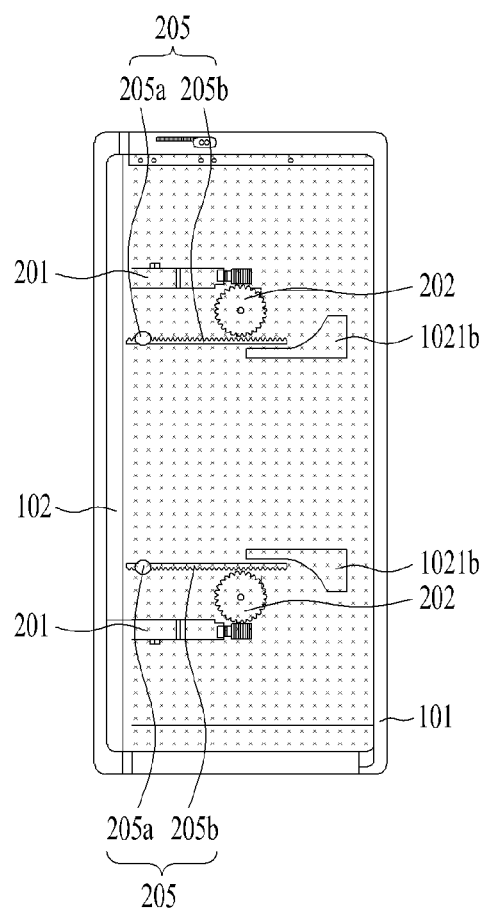
Figure 27:
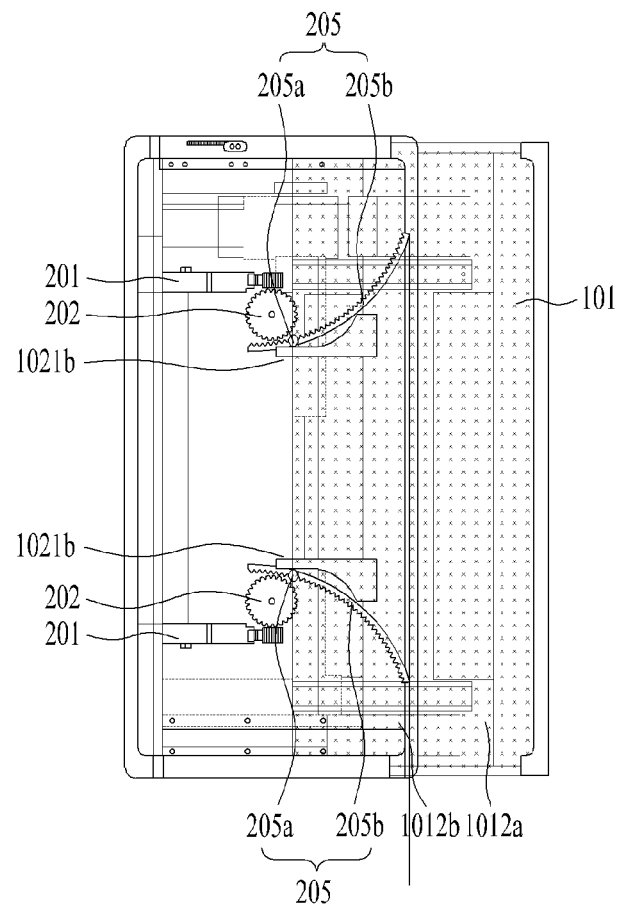

FIGS. 26 and 27 are front views illustrating the first state and the second state when the flexible display unit 151 is omitted and illustrate the rack gear 205 including the flexible gear 205b. The rack gear 205 of this embodiment also includes the fixed gear 205a fixed to the rear face of the first frame 101 and the flexible gear 205b that is not fixed to the first frame 101 and is extended at an end of the fixed gear 205a, as described above.

The pinion gear 202 of this embodiment is arranged to rotate about a rotation axis extended in a thickness direction, unlike the above-described embodiment. Accordingly, the toothed surface of the rack gear 205 may also be arranged to face a side direction rather than the rear face of the mobile terminal. In this case, due to the width of the rack gear 205, it is difficult to perform bending deformation in the thickness direction as shown in FIG. 23.

Accordingly, as shown in FIGS. 26 and 27, the rack gear 205 facing in the first direction may be bent to face in the third direction. While the fixed gear 205a may always be extended in the first direction in the first state and the second state, the flexible gear 205b may be curvedly bent in either the first state or the second state and an end thereof may be arranged to face in the third direction.

The flexible gear 205b may be positioned in the first direction with respect to the fixed gear 205a as shown in FIG. 26 or may be positioned in the second direction with respect to the fixed gear 205a as shown in FIG. 27.

In the embodiment of FIG. 26, the flexible gear 205b is bent in the first state and, in the embodiment of FIG. 27, the flexible gear 205b is bent in the second state. The above situation may be reversed depending on the position of the pinion gear 202.

In order to guide the bending deformation of the flexible gear 205b, the second frame 102 may include a curved guide 1021b. When the first frame 101 in the second state moves in the first direction as shown in FIG. 26(b), the flexible gear 205b is bent along the curved guide 1021b of the second frame 102 and switched from the first state to a bent state as shown in FIG. 26(a). Since the flexible gear 205b is located in the first direction with respect to the fixed gear 205a, the curved guide 1021b may also be located in the first direction with respect to the second frame 102. In FIG. 27, since the flexible gear 205b is located in the second direction, the curved guide 1021b may also located in the second direction and may be changed to a curve when switching to the second state.

The pair of gears 205b and 205a may be symmetrically arranged in the third direction so that the first frame 101 may move at a uniform speed in a vertical direction without being biased to one side. The rack gears 205 that are symmetrically arranged may serve as the linear guide 230 as well.

As described above, the mobile terminal according to the present disclosure has a variable size and thus usability and portability may be improved.

In addition, since the curved portion of the flexible display unit 151 is not limited to a specific region, stress applied only to a specific region when the size of the mobile terminal is changed may be distributed.

In addition, even when the mobile terminal 100 is extended, the display unit 151 may be stably maintained flat, so that a continuous large screen may be implemented in the extended state.

In addition, since the sliding movement of the mobile terminal may be performed naturally without distortion, the mobile terminal may be prevented from damage and failure during use.

In addition, since the rack gear 205 is prevented from being exposed to the outside in an extended state, introduction of contaminants may be prevented and durability may be improved.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A mobile terminal switchable between a first state and a second state in which the mobile terminal is in an extended state with respect to a first direction relative to the first state, the mobile terminal comprising:
   a body including a first frame and including a second frame movably coupled to a rear surface of the first frame with respect to the first direction or a second direction opposite to the first direction;
   a flexible display including a front portion positioned at a front surface of the body, a rear portion positioned at a rear surface of the body, and a side portion connecting the front portion and the rear portion of the flexible display and surrounding a side of the body; and
   a driver configured to slidably move the first frame along the first direction or the second direction with respect to the second frame,
   wherein the rear surface of the first frame includes:
   a first rear surface that is overlapping with the second frame when the mobile terminal is in the first state and that is exposed when the mobile terminal is in the second state; and
   a second rear surface located aside the first rear surface along the second direction that remains overlapping with the second frame when the mobile terminal is in the second state,
   wherein the driver includes:
   a motor installed in the second frame;
   a pinion gear configured to rotate upon receiving a rotational force of the motor; and
   a rack gear configured to be extended along the first direction and to move linearly in engagement with the pinion gear, and
   wherein the rack gear is fastened to the second rear surface of the first frame to not be exposed outside of the mobile terminal when the mobile terminal is in the second state.

2. The mobile terminal of claim 1,
   wherein a plurality of motors and a plurality of pinion gears are separately arranged along the first direction, and
   wherein the rack gear is further configured to move linearly in engagement with at least one of the plurality of pinion gears.

3. The mobile terminal of claim 1,
   wherein a pair of pinion gears is arranged in parallel along the first direction, and
   wherein the mobile terminal further comprises a gear chain configured to simultaneously surround the pair of pinion gears and to synchronize rotation of the pair of pinion gears.

4. The mobile terminal of claim 1, further comprising:
   a slide frame slidably coupled to a rear surface of the second frame with respect to the first direction or the second direction, wherein an end of the flexible display is fixed to a rear surface of the slide frame; and
   an auxiliary rack gear fastened to a front surface of the slide frame and configured to rotate in engagement with the pinion gear.

5. The mobile terminal of claim 4,
   wherein a pair of pinion gears is arranged in parallel along the first direction, and
   wherein the rack gear and the auxiliary rack gear are configured to slidably move in engagement with at least one pinion gear of the pair of pinion gears.

6. The mobile terminal of claim 4,
   wherein the pinion gear is configured to rotate in engagement with one of the rack gear or the auxiliary rack gear and cause the first frame and the slide frame to slidably move.

7. The mobile terminal of claim 6,
   wherein a length of the auxiliary rack gear is shorter than a length of the rack gear.

8. The mobile terminal of claim 1,
   wherein the rack gear includes:
   a fixed gear fastened to the second rear surface of the first frame; and
   a flexible gear connected to an end of the fixed gear and configured to be bendably deformable when the mobile terminal in the first state and when the mobile terminal is in the second state, and
   wherein the flexible gear is not fastened to the first frame.

9. The mobile terminal of claim 8, further comprising:
   a curved guide positioned inside the second frame and configured to guide the deformation of the flexible gear.

10. The mobile terminal of claim 8,
    wherein the pinion gear is configured to rotate about a rotational axis extending along a third direction perpendicular to the first direction, and
    wherein the flexible gear is configured to be bent in a thickness direction of the mobile terminal.

11. The mobile terminal of claim 8,
    wherein the pinion guide is configured to rotate about a rotational axis extending along a thickness direction of the mobile terminal, and
    wherein the flexible gear is configured to be bent in a third direction perpendicular to the first direction.

12. The mobile terminal of claim 1,
    wherein a pair of drivers is separately arranged along a third direction perpendicular to the first direction.

13. A mobile terminal comprising:
    a body including a first frame and including a second frame movably coupled to a rear surface of the first frame with respect to a first direction to switch to an extended state, or a second direction opposite to the first direction to switch to a reduced state; and
    a driver configured to slidably move the first frame along the first direction or the second direction with respect to the second frame,
    wherein the rear surface of the first frame includes a first rear surface that is exposed when the mobile terminal is in the extended state and a second rear surface that remains overlapping with the second frame when the mobile terminal is in the extended state, and wherein the driver includes:

a motor installed in the second frame;

a pinion gear configured to rotate upon receiving a rotational force of the motor; and a rack gear configured to be extended along the first direction and to move linearly in engagement with the pinion gear, wherein the rack gear includes:

a fixed gear fastened to the second rear surface of the first frame; and a flexible gear connected to an end of the fixed gear and configured to be bendably deformable when the mobile terminal in the reduced state and when the mobile terminal is in the extended state, and wherein the flexible gear is not fastened to the first frame.

14. The mobile terminal of claim 13, further comprising:
a curved guide positioned inside the second frame and configured to guide the deformation of the flexible gear.

15. The mobile terminal of claim 13,
wherein the pinion gear is configured to rotate about a rotational axis extending along a third direction perpendicular to the first direction, and
wherein the flexible gear is configured to be bent in a thickness direction of the mobile terminal.

16. The mobile terminal of claim 13,
wherein the pinion guide is configured to rotate about a rotational axis extending along a thickness direction of the mobile terminal, and
wherein the flexible gear is configured to be bent in a third direction perpendicular to the first direction.

17. The mobile terminal of claim 13,
wherein a pair of drivers is separately arranged along a third direction perpendicular to the first direction.

18. The mobile terminal of claim 13, further comprising:
a flexible display including a front portion positioned at a front surface of the body, a rear portion positioned at a rear surface of the body, and a side portion connecting the front portion and the rear portion of the flexible display and surrounding a side of the body.

* * * * *